US005768613A

United States Patent [19]
Asghar

[11] Patent Number: 5,768,613
[45] Date of Patent: Jun. 16, 1998

[54] COMPUTING APPARATUS CONFIGURED FOR PARTITIONED PROCESSING

[75] Inventor: Safdar M. Asghar, Austin, Tex.

[73] Assignee: Advanced Micro Devices, Inc., Sunnyvale, Calif.

[21] Appl. No.: 255,566

[22] Filed: Jun. 8, 1994

Related U.S. Application Data

[63] Continuation of Ser. No. 766,827, Sep. 27, 1991, abandoned, which is a continuation-in-part of Ser. No. 548,709, Jul. 6, 1990.

[51] Int. Cl.$^6$ ................................................. G06F 15/31
[52] U.S. Cl. ........................................................ 395/800.35
[58] Field of Search ............................. 395/800.35, 376

[56] References Cited

U.S. PATENT DOCUMENTS

| | | | |
|---|---|---|---|
| 4,387,269 | 6/1983 | Hashimoto et al. | 395/2.76 |
| 4,393,468 | 7/1983 | New | 364/749 |
| 4,635,211 | 1/1987 | Yoshida et al. | 395/2.79 |
| 4,639,877 | 1/1987 | Raymond et al. | 395/2.69 |
| 4,641,238 | 2/1987 | Kneib | 395/290 |
| 4,794,517 | 12/1988 | Jones et al. | 395/800.32 |
| 4,809,332 | 2/1989 | Jongman et al. | 395/2.4 |
| 4,845,752 | 7/1989 | Blanc et al. | 395/2.1 |
| 4,862,452 | 8/1989 | Milton et al. | 370/263 |
| 4,868,867 | 9/1989 | Davidson et al. | 395/2.39 |
| 4,926,355 | 5/1990 | Boreland | 395/800.36 |
| 4,942,516 | 7/1990 | Hyatt | 395/800.32 |
| 4,947,454 | 8/1990 | Garner | 455/84 |
| 4,969,193 | 11/1990 | Scott et al. | 395/2.25 |
| 4,979,102 | 12/1990 | Tokuume | 364/200 |
| 4,991,169 | 2/1991 | Davis et al. | 370/77 |
| 5,029,079 | 7/1991 | Magar et al. | 364/726.02 |
| 5,046,080 | 9/1991 | Lee | 379/53 |
| 5,199,062 | 3/1993 | Von Meister | 379/67 |

OTHER PUBLICATIONS

D.F.Rogers, "Dual–Chip Semiconductor Module", IBM Technical Disclosure Bulletin, vol. 25, No. 5, Oct., 1982.
W.B.Archey, et al., "Microsystem Package for Chips", IBM Technical Disclosure Bulletin, vol. 24, No. 3, Aug., 1981.
Bernard C. Cole, "At Last, the Marriage of DSP with Microcontroller Features", Electronics, Oct., 1988.
Lisa Gunn, "DSP Uproots Traditional Analog Jobs", Electronics Design, Sep. 28, 1989.
Richard A. Quinnell, "32–bit Embedded Controllers", EDN, May 24, 1990.
Michael Slater, "Selecting the Right Microprocessor", Microprocessor, 1990.
Michael C. Markowitz, "Microprocessor Directory: 80186/80188", EDN, Nov. 22, 1990.
Dave Burksy, "Microcontroller Eases Closed–Loop Servo Control", Electronic Design, Aug. 22, 1991.
Mark Thorson, "Zilog Merges Microcontroller and DSP", Microprocessor Report, vol. 5, No. 16, Sep. 4, 1991.

Primary Examiner—David Y. Eng
Attorney, Agent, or Firm—Foley & Lardner

[57] ABSTRACT

An apparatus for processing signals including a signal receiving circuit, a first processing circuit executing a first set of instructions, a second processing circuit executing a second set of instructions implementing a digital signal processing algorithm, an output circuit for outputting processed signals, and a communication circuit for communicatingly connecting the signal receiving circuit, the first processing circuit, the second processing circuit, and the output circuit. The first set of instructions includes control instructions for controlling operation of the apparatus and first operational instructions for processing signals; the second set of instructions includes second operational instructions for processing signals; selected of the second operational instructions produce interrupt results. When the first processing circuit receives an interrupt result it processes the interrupt result as a priority interrupt in executing the first set of instructions.

40 Claims, 21 Drawing Sheets

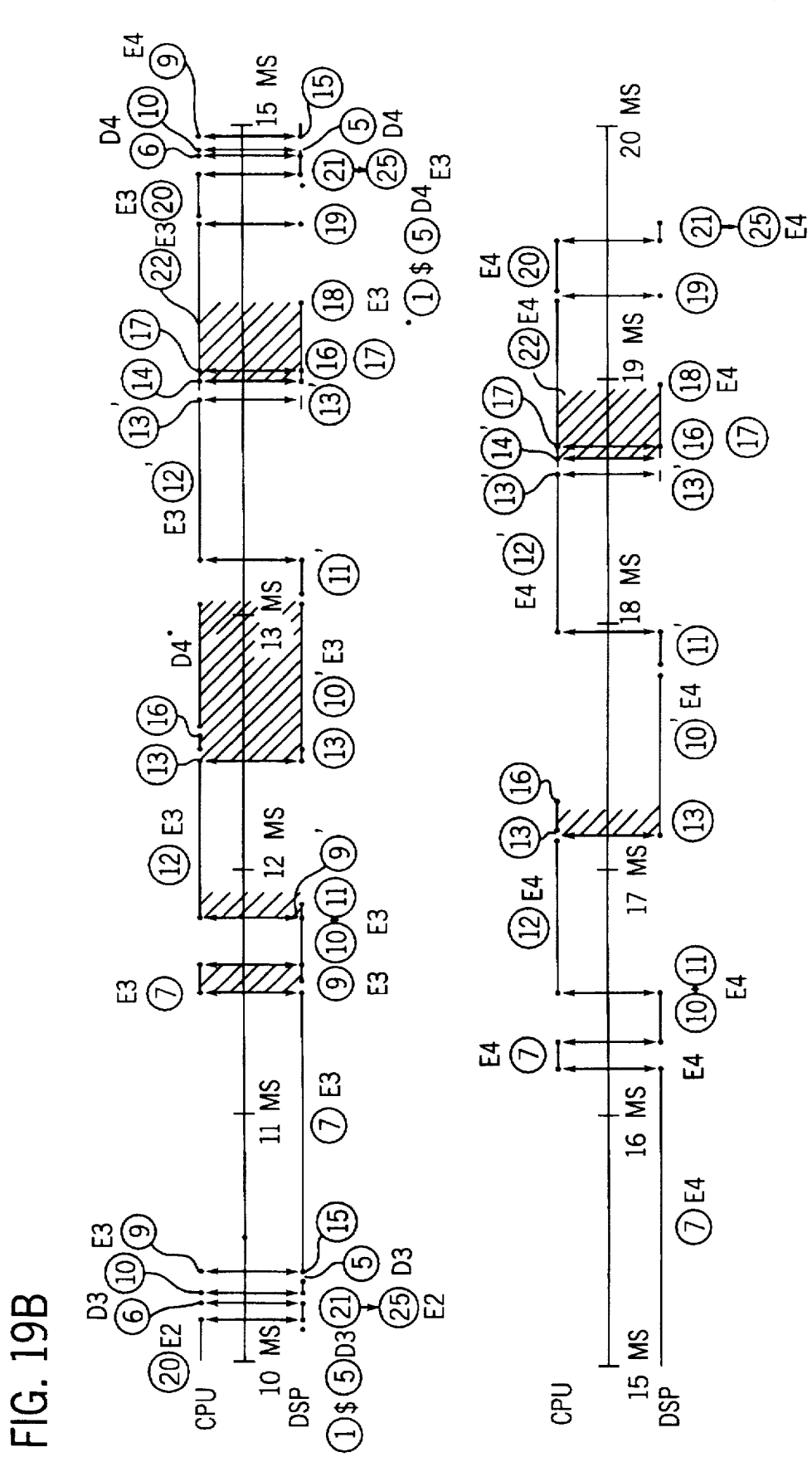

COMPUTING APPARATUS CONFIGURED FOR PARTITIONED PROCESSING

CROSS REFERENCE TO RELATED APPLICATIONS

This is a Continuation of application Ser. No. 07/766,827, filed Sep. 27, 1991, abandoned, which is a Continuation-in-Part of application Ser. No. 07/548,709, filed Jul. 6, 1990.

BACKGROUND OF THE INVENTION

1. Field of the Invention

This invention relates to processors for voice band telecommunications and more particularly to digital processors which have the capability of processing code excited linear predictive algorithms.

2. Discussion of Related Art

Recently, cellular telephone systems have become more practical and popular. Their popularity has increased to the point where service availability will soon be unable to meet demand. It has therefore been proposed to implement a digital cellular network which incorporates predictive speech signal coding for reducing the bandwidth of transmitted speech thereby enhancing system performance and enabling time division multiplexing which significantly increases user availability.

The Telecommunication Industries Association has adopted a standard, Digital Cellular Standard IS-54, which implements a vector sum excited linear predictive (VSELP) vocoder algorithm for use in the United States. This algorithm is computationally intensive, requiring on the order of $6.45 \times 10^6$ arithmetic operations per second and 15.6 million instructions per second (MIPS).

Other areas of the world are also moving toward digital cellular systems. Japan has recently adopted a VSELP algorithm similar to the United States, and Europe is moving toward a CELP algorithm referred to as Group Special Mobile (GSM).

Currently, digital signal processors (DSPs) such as the DSP65000 family manufactured by Motorola, Inc. are available for implementing digital algorithms such as digital filters, fast fourier transforms, correlation functions, etc. Such processors have special features such as modulo addressing, hardware DO loops, 24-bit by 24-bit hardware multipliers, etc. to facilitate the large number of high precision arithmetic operations required in digital signal processing. DSPs are ideally suited for executing the VSELP and similar algorithms except that current models have too low a clock rate. The DSP65000 family, for example has a nominal clock rate of 20.48 MHz giving an execution rate of 10.24 MIPS. This can be increased to 27 MHz for an execution rate of 13.5 MIPS. To accommodate the 15.6 MIPS needed for IS-54, the clock rate would have to be increase to about 32 MHz. Such an increase would require redesign of the DSP.

SUMMARY OF THE INVENTION

One object of the present invention is to provide a communications processor for implementing IS-54 and other computationally intensive digital signal processing algorithms using conventionally available components operating at convention clock rates.

Another object of the present invention is to provide a communications processor which contains a user programmable functionality permitting the execution of instructions in addition to the computationally intensive digital signal processing algorithm without adversely affecting execution of the algorithm.

A further object of the present invention is to provide a communications processor implemented on a single integrated circuit chip.

In accordance with the above and other objects, the communications processor of the present invention comprises, in a single integrated circuit chip, the combination of a central processing unit (CPU) having an execution unit with an arithmetic logic unit and accumulators, a program counter, memory, a clock generator, a timer, a bus interface, chip select outputs, and an interrupt processor; a digital signal processor (DSP) having an instruction set to carry out a digital signal processing algorithm, an execution unit for carrying out multiply and accumulate operations and an external interface; an address bus connected between the CPU and the DSP; a data bus connected between the CPU and the DSP; and a static scheduler for statically scheduling execution of the signal processing algorithm between the digital signal processor and the CPU.

In accordance with other aspects, the digital signal processing algorithm may be a digital speech processing algorithm and the scheduler may be contained in the DSP and may include an interrupt generator for generating interrupts to the CPU to command execution by the CPU of portions of the speech processing algorithm. The CPU interrupt processor processes the interrupts from the DSP as non-maskable interrupt signals to ensure that execution of the algorithm takes priority over other programs.

To exploit the advantages of the DSP and CPU, the static scheduler partitions execution of the signal processing algorithm to cause all multiply and multiply-accumulate operations to be executed in the DSP and all other operations such as add, subtract, divide, compare, etc. to be executed in the CPU.

In accordance with other aspects of the invention, the speech processing algorithm may be a code excited linear predictive coding algorithm and, in particular, may be a vector sum excited linear predictive coding algorithm.

The CPU includes operating system support for permitting user programming of the CPU. The static scheduler controls the operating system support to give priority to execution of the signal processing algorithm.

The static scheduler effects simultaneous operation of the CPU and DSP during portions of the execution of said signal processing algorithm.

BRIEF DESCRIPTION OF THE DRAWINGS

The above and other objects of the invention will become more readily apparent as the invention is more fully understood based on the detailed description below, wherein like reference numerals represent like parts throughout and wherein:

FIGS. 19A–19B are timing diagrams useful with table 1 to show the partitioning of arithmetic operations between the digital signal processor and the central processing unit of FIG. 2 when implementing a VSELP algorithm;

DETAILED DESCRIPTION OF THE PREFERRED EMBODIMENTS

Figure 1:
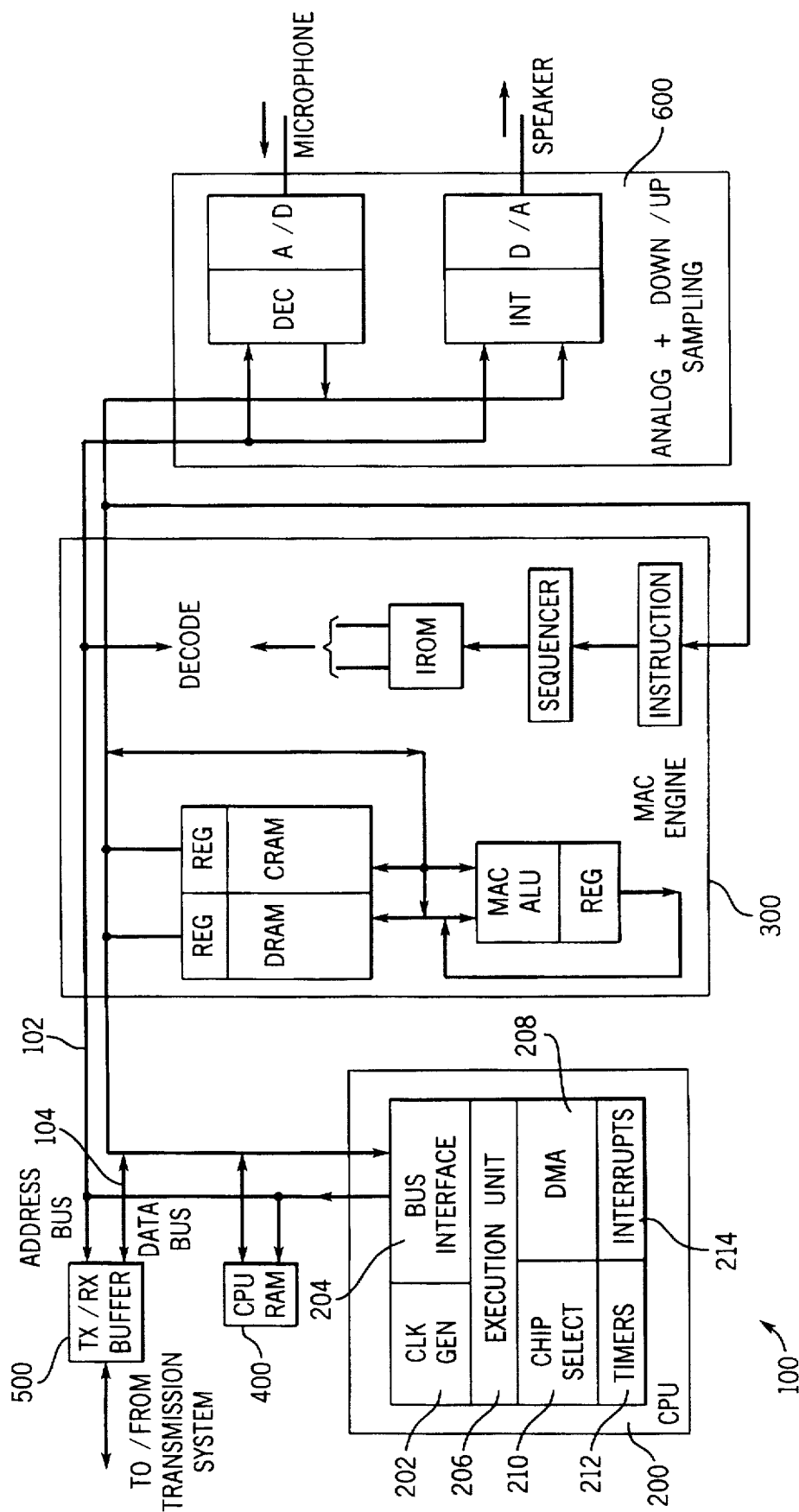
FIG. 1 is a block diagram showing the main components of the communications processor of the present invention.

FIG. 1 shows the communications processor 100 of the present invention. Processor 100 is a highly integrated IC for implementing IS-54 or GSM compliant cellular telephones. This handset-resident device combines with RAM and ROM to provide a complete set of functions between audio transducers and an RF modem, including speech processing, user interface and system control.

One of the key elements of the architecture is the unique combination of a standard microprocessor shown in FIG. 1 as CPU 200 with a dedicated custom DSP engine shown in FIG. 1 as multiplier-accumulator (MAC) engine 300 and a multi-port static RAM (SRAM) 400 to process the VSELP and GSM speech compression algorithms. This combination reduces die size while performing both voice processing and system control.

FIG. 1 shows the organizational relationship of the major components of the communications processor 100 of the present invention. CPU 200 may be a convention 80186 type processor such as the model 80C186 microprocessor sold by Advanced Micro Devices of Sunnyvale, Calif. This processor includes a clock generator 202, a bus interface 204, an execution unit 206, a direct memory access unit 208, a chip select unit 210, timers 212, and an interrupt processor 214. In accordance with the present invention, CPU 200 can be programmed by a user to implement user designated functions and operates in conjunction with DSP 300 to carry out VSELP in accordance with IS-54 and other signal processing algorithms, as will be explained in greater detail below.

CPU 200 communicates with SRAM 400 and DSP 300 through a bus system which includes address bus 102 and data bus 104. These busses also provide communication to a transmit/receive buffer 500 and an audio interface section 600.

As will be understood by reference to FIG. 1, communications to a base station or the like, if a cellular phone system implementation is adopted, is made through buffer 500 which can connect to a transmission system including a modem, a radio or the like. Communication to the local user is made through interface 600 which connects to a microphone and a speaker, as will be discussed in greater detail below.

Figure 2:
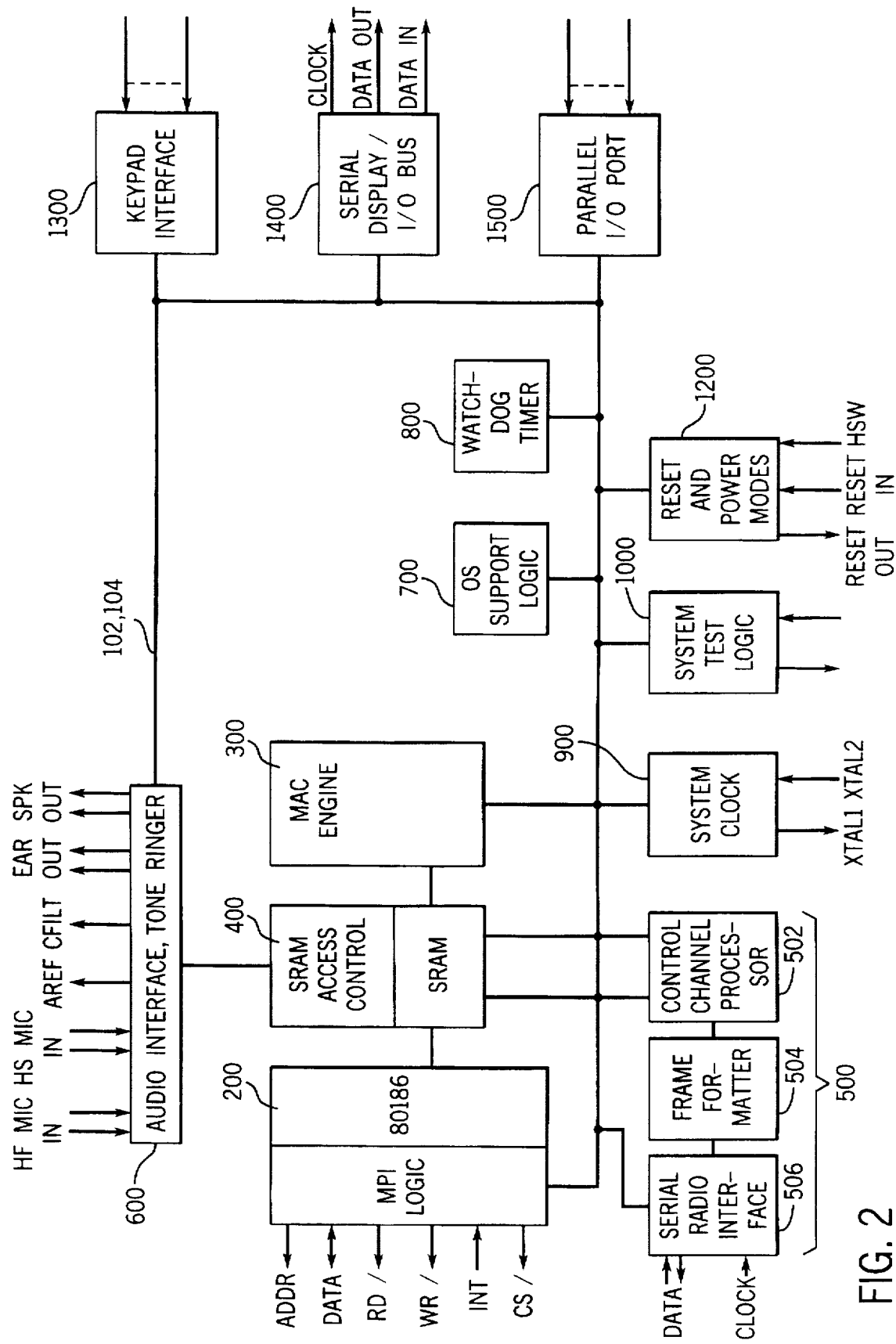
FIG. 2 is a more detailed block diagram of the communications processor of the present invention.

FIG. 2 shows more details of the communications processor 100. As shown in FIG. 2, the on-chip circuitry also includes an operating system support unit 700, a watchdog timer unit 800, a system clock 900, a system test logic unit 1000, and a reset and power modes unit 1200.

User programming of the CPU is made available through a keypad interface 1300, a serial display and I/O bus unit 1400 and one or more parallel output ports 1500.

A brief description of the function of each component of FIG. 2 will now be set forth.

Figure 3:
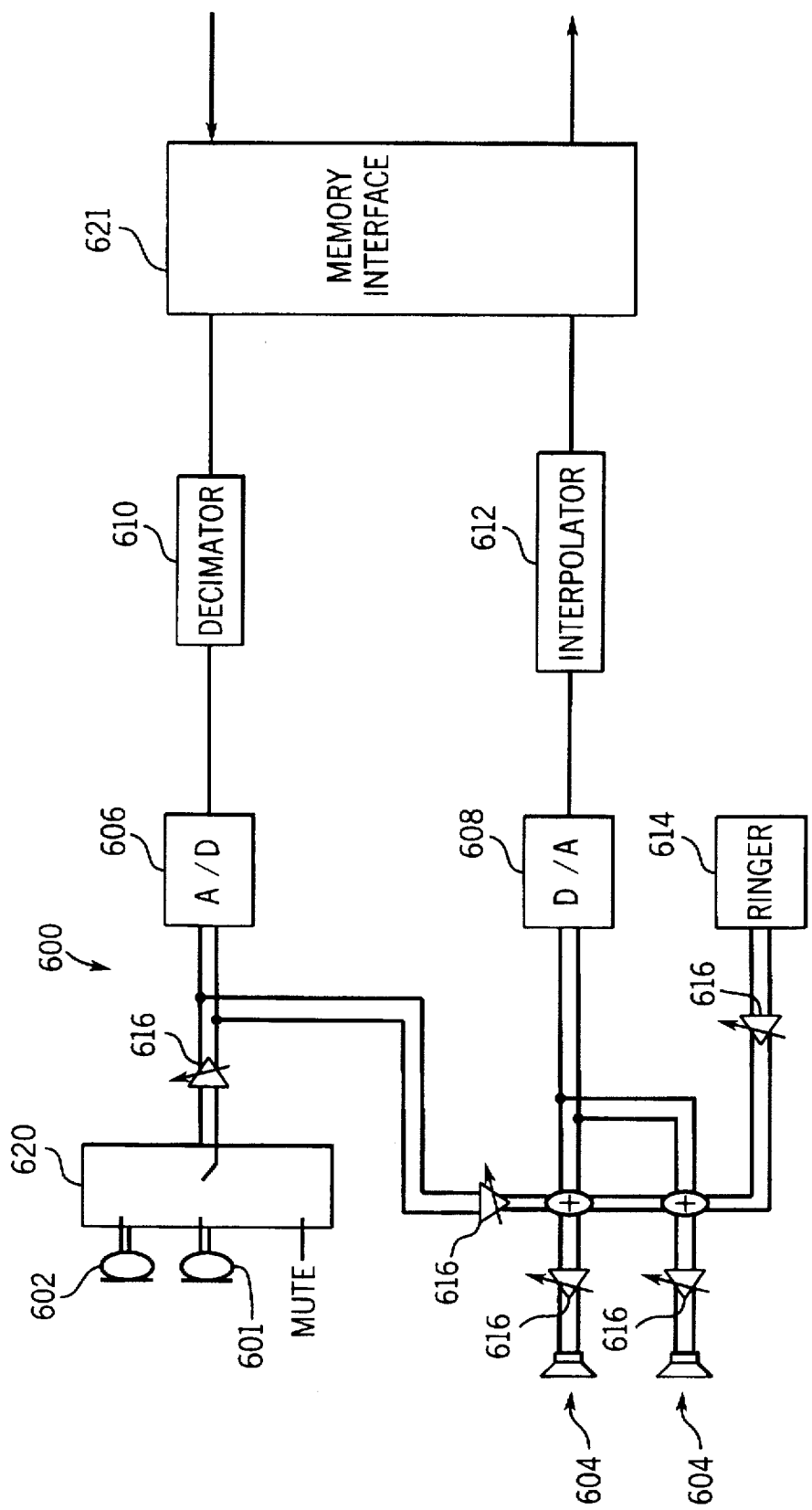
FIG. 3 is a block diagram showing the audio interface of FIG. 2.

The audio interface 600 is shown in more detail in FIG. 3. Interface 600 provides an earpiece and loudspeaker 604 interface, handset microphone 601 and hands-free microphone 602 interface 620; A/D converter 606, D/A converter 608, hardware decimator 610, hardware interpolator 612 and tone ringer unit 614. Programmable gain units 616 are provided for all analog inputs and outputs.

The transmit path of interface 600 has two inputs which are multiplexed into a programmable gain stage (6→24 dB; 3 dB steps) connected to an over-sampling A/D converter 606. The output of the A/D is decimated in hardware unit 610 to 16 kHz. This signal is loaded into the on-chip SRAM 400 for use by the speech processing engine. With 6 dB of programmed gain, a 625 mV input produces a full-scale digital output.

On the receive side, the 16 kHz output of the speech processor is interpolated in hardware unit 612 and fed into D/A converter 606. The output of the D/A feeds either the earpiece, loudspeaker, or both. A programmable analog gain stage is located in each path (0→−36 dB; 3 dB steps). The earpiece driver can drive a 540 Ohm load at 5 V P-P. The loudspeaker driver can drive a 40 Ohm load at 5 V P-P. With 0 dB of gain programmed into either path, a full-scale digital code produces the full-scale output voltage.

The tone ringer 614 produces a nominal 50% duty cycle rectangular wave form having a programmable frequency range from 12 kHz to 200 Hz. The amplitude of the output is programmable, starting with a 5 V P-P maximum level, attenuated by up to −36 dB in 3 dB steps. The tone ringer is summed into the loudspeaker output. The ringer and loudspeaker output buffer can be operated with the rest of the audio interface disabled.

Analog loop back and input mute function is provided in interface 620. An analog sidetone path, with programmable gain (range and resolution) is also provided.

A reference voltage output, approximately 2.4 Volts, is provided for biasing external circuitry (including electret microphones). A related pin is provided for filtering the internal bias reference from which the reference voltage output is derived.

A memory interface 622 moves digitized audio between the internal SRAM 400 and the audio interface by a dedicated DMA mechanism. Transmit and receive buffer spaces are set aside in the SRAM. These buffers function as FIFOs, and are sufficiently deep to compensate for the block nature of the speech processing algorithm. The buffers have fixed base addresses. The memory interface moves data to and from the buffers at a rate of 16k words per second in each direction.

The CPU 200 is a complete 80C186 microprocessor, capable of running at up to 20 MHz. The 80C186 provides two 16-bit timers, programmable chip select outputs, and an interrupt controller. Some of these resources are used internally, and are not available to the user.

The clock speed of the CPU is dynamically controlled by the system clock generator block 900, with the user having programmable control over the clock speed.

The clock generator block 900 serves as the master distribution point for clock signals used by the various blocks. This centralized scheme is used to reduce power consumption within the communications processor 100. The block contains the crystal oscillators and various dividers. One of these dividers is associated with the CPU clock input. This divider is programmable, allowing the clock speed, and thus the power consumption, of the processor to be reduced whenever the workload on the processor is low. The processor clock speed can also be changed automatically in response to hardware interrupts. If this option is selected, any hardware interrupt to the CPU will force the clock speed to maximum. This reduces interrupt response latency when operating at extremely slow clock speeds. The clock is unconditionally sped up to response to an NMI, and automatically returned to its previous speed upon a return from NMI. After power on reset, the maximum clock speed is applied to the CPU as a default. The maximum dividing factor that can be applied to the system clock generator is 64. The CPU clock can also be programmed to stop.

There are three classes of interrupts supported by the CPU: 1) NMI from the MAC engine 300; 2) direct interrupts to the cpu; and 3) indirect interrupts. The NMI from the MAC is the basic task/scheduler interrupt controlling the switch between speech processing and user CPU time. The NMI is generated by the MAC engine 300, and fed directly to the CPU's NMI input. The direct interrupts are those connected directly to four maskable interrupt inputs on the CPU 200. The keypad scanner 1300, parallel I/O 1500, and control channel processor 502 generate direct interrupts. The fourth direct interrupt is generated by an indirect interrupt controller, which gathers all remaining interrupts into a single interrupt. Any interrupts from external user circuitry feed into the parallel I/O port.

The 80C186 processor used as CPU 200 has three timers, two have input and output pins (timers 0 and 1), one (timer 2) has no I/O connections. Timer 0 is pinned-out for user access, timer 1 is not used either internally or externally, and timer 2 is dedicated to internal functions.

The 80C186 generates 13 programmable chip select outputs. Six of these are for memory devices, seven are for peripherals. Of these, MCS0, MCS1, UCS, LCS, PCS0 AND PCS1 are provided to the user. The remaining chip select outputs (MCS1, MCS2, PCS2, PCS3, PCS4, PSC5, AND PCS6) are not used either internally or externally.

The 80C186 internal DMA controllers (two) as well as the external HOLD/HOLDA function are not supported by the communications processor 100.

The following is a list of 80C186 pins. Pins with an * beside the mnemonic are not used. Pins with a + beside the mnemonic are used internally, and are required only for emulation.

| | |
|---|---|
| A19/S6 | INT2-INTA0/+ |
| A18/S5 | INT3-INTA1/+ |
| A17/S4 | LCS/ |
| A16/S3 | LOCK/* |
| AD15 | MCS0/–PEREQ |
| AD14 | MCS1/ERROR |
| AD13 | / |
| AD12 | MCS2/* |
| AD11 | MCS3–NPS/* |
| AD10 | NMI+ |
| AD9 | PCS5–A1* |
| AD8 | PCS6–A2* |
| AD7 | PSC4/* |
| AD6 | PSC3/* |
| AD5 | PSC2/* |
| AD4 | PSC1/ |
| AD3 | PSC0/ |
| AD2 | RD/–QSMD/ |
| AD1 | RES/* |
| AD0 | RESET* |
| ALE/QSO | S2/ |
| ARDY | S1/ |
| BHE/ | S0 |
| CLKOUT* | SRDY |
| DEN/ | TEST/–BUSY* |
| DRQ0* | TMR IN 0 |
| DRQ1* | TMR IN 1* |
| DT-R/ | TMR OUT 0 |
| HOLD* | TMR OUT 1* |
| HLDA* | UCS/ |
| INT0+ | WR/–QS1 |
| INT1+ | X1 |
| | X2* |

Figure 4:
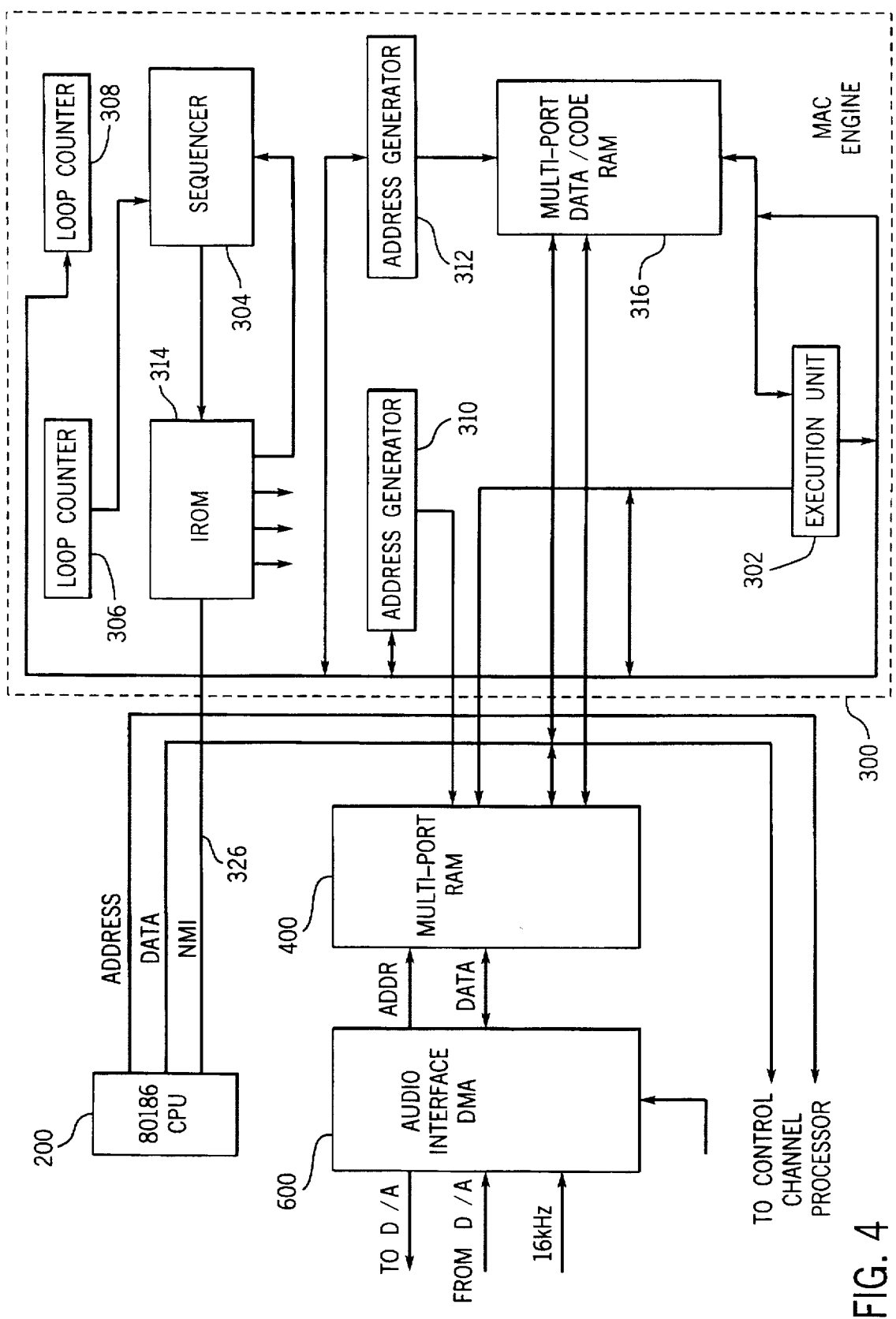
FIG. 4 is a block diagram showing more detail of the Multiplier-Accumulator engine of FIG. 2.

The Multiply/Accumulate (MAC) engine 300 is a special purpose DSP engine designed to work with the CPU 200 to perform complex speech processing algorithms. The MAC engine is shown in greater detail in FIG. 4 to include an execution unit 302, a sequencer 304, various loop counters 306, 308 and address generators 310, 312, an instruction ROM 314, and an external interface to the SRAM 400. The MAC may also include conventional DSP features such as a 24 bit×24 bit hardware multiplier and hardware do loops to help carry out its specialized function.

The MAC engine 300 functions as the master in a master/slave relationship with the CPU 200. Synchronization is maintained by non-maskable interrupts (NMIs) generated by the MAC engine 200 and transmitted to the CPU 200 NMI input on NMI line 326. A sequence counter is maintained by the MAC engine 300. This counter is incremented by the MAC engine 300 every time an NMI is generated, and cleared at the end of each frame. The CPU 300 reads the counter as an interrupt pointer.

The speech algorithms or other signal processing programs to be implemented by MAC 300 are microcoded in internal ROM 314 and are not accessible by the user. These algorithms process complex speech processing algorithms on sampled speech data stored as blocks in RAM 316.

Instruction Set—The MAC Instruction set supports digital speech processing algorithms which include such functions as convolution, correlation, interpolation, decimation, vector orthogonalization, and recursive filtering. These functions are performed on data stored as blocks and the architecture of the engine reflects this application. The operations necessary to implement these functions include multiply, multiply-accumulate, add, subtract, data overflow management, sequential block addressing, data movement, and data scaling among others. They are summarized below:

Accumulator Memory Reference Instructions
Absolute value of Accumulator
Add to Accumulator with shift
Add to Accumulator with carry
Add to high Accumulator
Add to Low Accumulator with sign extension suppressed
Load accumulator with shift
Store High Accumulator with shift
Store Low Accumulator with shift
Subtract from Accumulator with shift
Subtract from Accumulator with borrow
Subtract from High Accumulator
Subtract from Low Accumulator with sign extension suppressed
Zero Accumulator
Memory Address Generator Instructions
Load address generator
Modify address generator
Store address generator
Multiply Instructions
Add product register (Preg) to Accumulator
Load temporary register (Temp)
Load Temp and accumulate previous product
Load Temp and store Preg in Accumulator
Load Temp and subtract previous product
Multiply and accumulate
Multiply (with Temp, store product in Preg)
Multiply and Subtract previous product
Multiply (with Temp) and accumulate previous product
Multiply unsigned
Load Accumulator with Preg
Store High Preg
Store Low Preg
Set Preg output shift mode
I/O and Data Memory Operation
Input data from mailbox
Output data to mailbox
Set External Interrupt flag and load Action Register
Reset External Interrupt flag
Enable Loop Counter
Disable Loop Counter As discussed above, the MAC engine 300 operates as the master to slave CPU 200. Control of the CPU is achieved by setting an external flag on line 326 which acts as a non-maskable Interrupt (NMI) to the CPU. An action counter is updated by the MAC engine which is readable by the CPU on interrupt request acknowledge and thereby task synchronization is maintained. Communication of data and control parameters to and from the CPU is made via the dedicated dual-ported RAM 316 which employs a mailbox handshaking mechanism. Static scheduling of the speech processing algorithm between the MAC engine and CPU allows this simple and efficient interface to communicate parameters in order to compute the algorithm functions.

The internal SRAM unit 400 is a single port structure with a multi-port access arbitrator. The SRAM unit 400 is accessed by the MAC engine 300, the CPU 200, the audio interface 600, and the control channel processor 502, which is part of the transmit/receive buffer 500. The RAM is organized on byte, word (16), and long word (24) boundaries depending on which module is accessing it. The total RAM size is consistent with the requirements of the program to be run. The SRAM may be partitioned into separate blocks to simplify the access control mechanism. For example, the RAM associated with the FACCH, SACCH, CDVCC functions may be located in a separate partition from RAM used for speech data.

The operating support logic unit 700 is hardware specific to provide task scheduling for the CPU 200 between a speech processing operation and "user code" received and located in this block. The partitioning between the speech functions and the user functions is rigidly enforced by a static scheduler.

In order to support the static partitioning of the CPU between speech processing and non-speech tasks, all real-time events, such as interrupts not associated with the speech algorithm, must be presented to the CPU 200 only during non-speech windows. The function of the OS support logic block 700 is to perform this isolation function. In general, interrupts will automatically be blocked by the fact that the speech functions occur during the NMI service routine which cannot be interrupted by other interrupts (the NMI is used as the mechanism by which the speech function gains control of 80C186, with control being returned to non-speech tasks when a return from NMI instruction is executed). Therefore, no specific logic is required to hold off non-speech interrupts.

As mentioned above, the CPU operates both as the system CPU and as part of the speech processor. What the user actually sees is a portion of the CPU processing capacity. The partitioning between system functions and speech processing is enforced by the OS support logic block, and a firmware shell. The scheduling mechanism is static in nature, giving the CPU resource to the speech operation unconditionally at very specific times. When the CPU is not performing speech related tasks, it is available for system functions. As a consequence of the static scheduling, the user sees the CPU for a portion of the time, with rigidly enforced gaps when the processor is unavailable. These gaps are transparent to the user, with the exception that the CPU is not working on non-speech tasks during the gaps. This means that all system tasks including interrupts are blocked (held off) during speech processing windows.

Some handshaking may be required between the OS support logic and the power mode control functions to insure that the shut-down and idle modes are entered and exited in an orderly fashion.

The MAC engine 300 provides the indication as to whether the 80C186 is in speech or non-speech mode at any given time.

The control channel processor 502 functions differently depending on the algorithm being implemented, such as whether it is in GSM or IS-54 mode. The basic function of the control channel processor 502 is to perform forward error control and cyclic redundancy check (CRC) functions on the data channel, and bit-level processing on the control channel.

Figure 5:
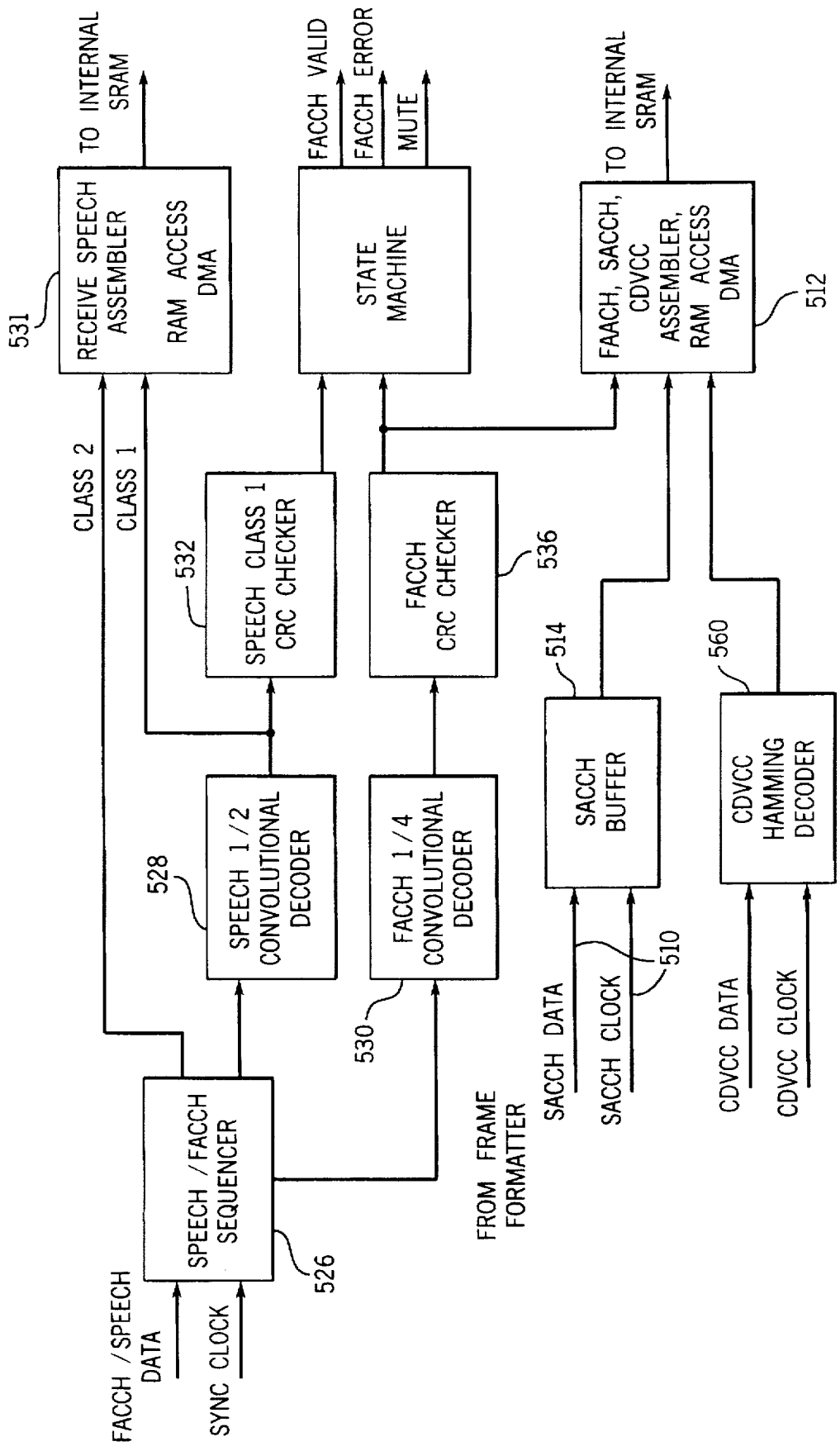
FIG. 5 is a block diagram showing the receiver section of the control channel processor of FIG. 2.
Figure 6:
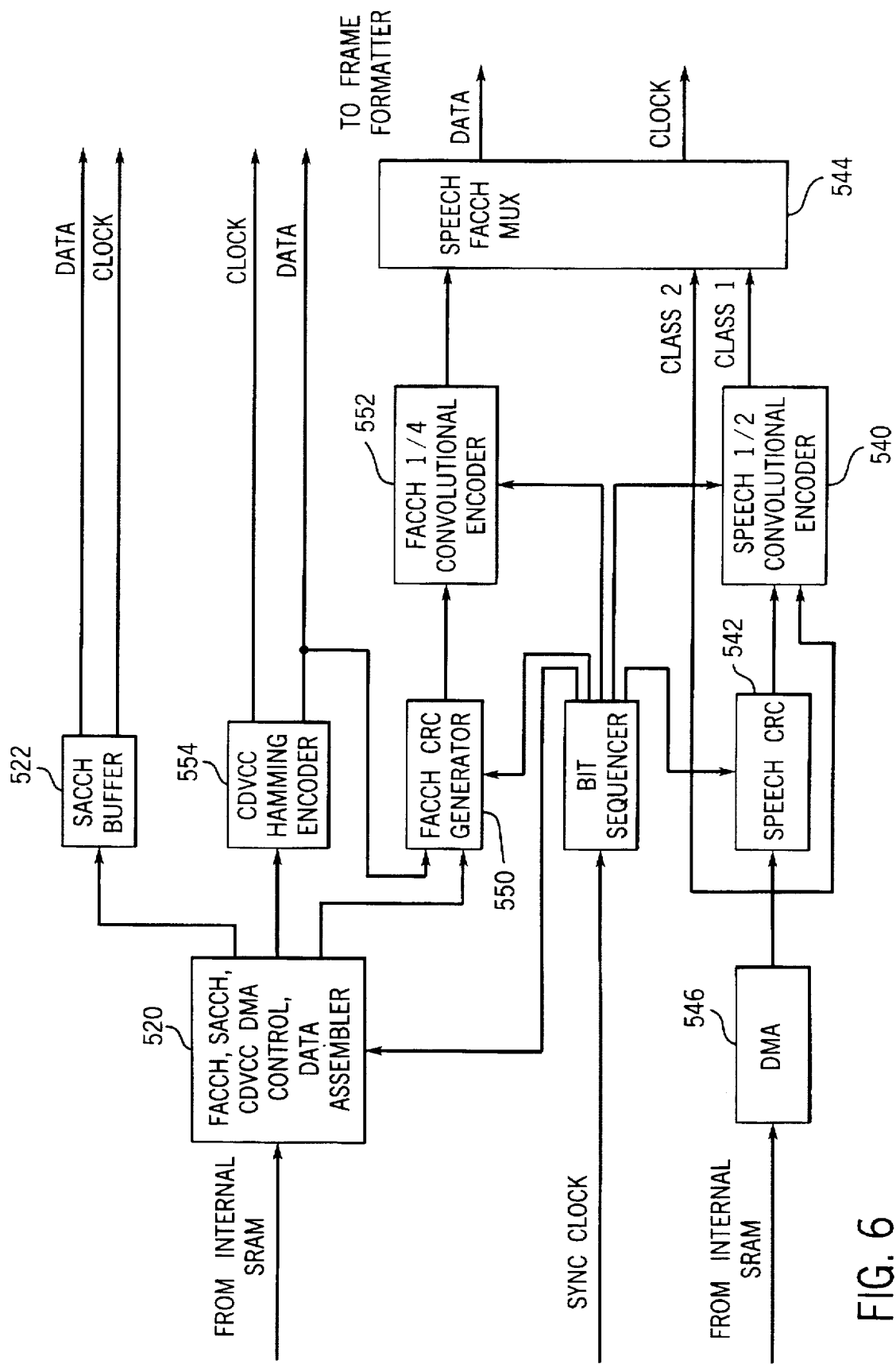
FIG. 6 is a block diagram showing the transmitter section of the control channel processor of FIG. 2.

In IS-54 mode, the control channel processor 502 is ideal during analog and call set-up operation, to be discussed below. The 80C186 CPU 200 handles all control processing during analog and call set-up modes. During digital operation, there are four channels to be processed: SACCH, speech, CDVCC, and FACCH. The presence of Fast Associated Control Channel (FACCH) messages in the data channel must be detected and the data processed. FIGS. 5 and 6 show block diagrams of the receive and transmit sections of the control channel processor.

ACCH, Receive—as shown in FIG. 5, receive SACCH data is fed to the control channel processor from the frame formatter on lines 510. Hardware within the control channel processor block 512 DMAs the data from a shift register to a buffer in internal SRAM. The SACCH data is in encoded form (½ convolution code) and interleaved with SACCH data from 23 slot times. The data is not processed in hardware, rather, it is moved to an internal RAM buffer. From there it is moved by the 80C186 CPU 200 to external RAM for processing by the user software.

SACCH, Transmit—SACCH data to be transmitted is encoded (½ convolution code), interleaved, and placed in external RAM by the 80C186 CPU 200. From there it is moved by the 80C186 CPU 200 to a buffer in internal RAM. As shown in FIG. 6, hardware within the control channel processor unit 520 DMAs the data to a shift register 522 inside the control channel processor.

Speech, Receive—The data channel can contain either Speech or FACCH data. Since the communications processor 100 does not know in advance which type of data is contained in any given received frame, the data must be processed as both Speech and FACCH data.

In the receive direction, as shown in FIG. 5, speech data is split into class 1 and class 2 portions in a sequencer 526. The class 1 portion is processed through a ½ convolution code processor 528 and a CRC checker 532 before being placed into internal SRAM by controller 534. Class 2 data is placed directly into the SRAM by controller 534.

ACCH, Receive—The received data channel is also passed through the FACCH processor wherein it is fed to a ¼ convolution decoder 530 and a CRC checker 536. If the CRC check is valid, it is an indication that the data was in fact FAACH data, otherwise it is considered Speech data. Valid FACCH data is DMAed into an internal RAM buffer.

Speech, Transmit—On the transmit side (FIG. 6), the system knows in advance whether the data is Speech or FACCH. Speech data to be transmitted is placed into SRAM by the MAC engine, in class 1 and class 2 fields. The class 1 field is fed through a ½ convolution encoder 540 and a CRC generator 542 by DMA unit 546, before being passed to the frame formatter by multiplexer 544. Class 2 data is passed directly to the frame formatter by multiplexer 544.

FACCH, Transmit—FACCH data to be transmitted is placed into a buffer in internal RAM by the 80C186 CPU 200. From there it is DMAed into the control channel processor and fed through a ¼ convolution coder 550 and a CRC generator 552 before being passed to the frame formatter by multiplexer 544.

CDVCC, Receive—The received CDVCC data from the frame formatter is processed through a 12, 8 hamming code decoder 560 and DMAed to a buffer in internal RAM. From there it is processed by the 80C186.

CCVCC, Transmit—The 80C186 CPU 200 writes the CDVCC byte to a buffer within the control channel processor. From there it is processed through a 12, 8 hamming code encoder 554 and shipped to the frame formatter.

GSM—In GSM mode, the following functions are performed on the Speech channel: In the receive direction, the HDLC (LAPM) bit level processing is handled in the control channel processor, and the data is placed in the internal SRAM. In the transmit direction, packets are formatted by the 80C186 and placed into the internal SRAM. From there, the control channel processor executes the bit level HDLC protocol and passes the data to the frame formatter.

Interrupts—The control channel processor generates a direct interrupt to the CPU 200 in response to certain status conditions. These conditions include: FACCH, SACCH, and CDVCC received data service requests; FACCH and SACCH transmission complete indications; speech error mute requests, and an FACCH error indication.

The frame formatter 504, which is also part of the transmit/receive buffer 500, functions differently depending on the algorithm being implemented, such as on whether it is in GSM or IS-54 mode. In IS-54 mode, the frame formatter assembles and disassembles 20 millisecond transmit and receive slots (two per frame). The data is broken down into coded digital verification color codes (CDVCC), slow associated control channel (SACCH), and voice/fast associated control channel (FACCH) data streams. The frame formatter sits between the serial radio interface 506 and the control channel processor.

In the transmit direction, speech/FACCH, SACCH, and CDVCC data is combined with sync, guard, and ramp bits from units 580, 582 and 584 in multiplex sequencer 586 and sent to the serial radio interface 506. The speech or FACCH data is assembled in a buffer 560 by a sequencer 562 that performs a slot interleaving operation over two slot times. Because of the nature of the interleaving algorithm, the buffer is two blocks deep. Data is transmitted out of one block while the next block is being assembled.

Since the serial radio interface carries both control and data information, its bit rate is faster than the bit rate for the radio. For this reason, a radio bit rate clock is generated for speech operations and the serial radio interface (SRI) bit clock on line 590 is used for transmission and reception of non-speech functions. The radio bit rate clock is phase-locked to the recovered slot synchronization.

The receiver demultiplexes the data received from the serial radio interface into speech/FACCH, SACCH, and CDVCC bit streams in a duplexer/sequencer 570. The speech data is deinterleaved and stored in a two-slot deep buffer 592. The SACCH and CDVCC data streams are fed directly to the control channel processor. A sync detector 594 identifies both the slot boundaries as well as the slot ID.

The serial radio interface 506 (FIG. 2) combines the bit stream to be transmitted (or received) with control commands to and from the CPU and the radio into a single serial bit stream. This is a three wire interface having transmit data, receive data, and bit clock signals. A framing pattern is embedded into the data stream. The definition of this block is totally dependent upon the user radio to which it is attached.

A sanity timer is included in the communications processor 100. The timer is permanently enabled, generating a 2 ms pulse on the RESET/(active low) pin if it times out. Hardware internal to the communications processor is also reset by a watchdog timer 800 (FIG. 8) time-out; the result is identical to activating the RESET/pin. A hardware reset is generated to the communications processor 100 if a counter 802 is not cleared every 2 seconds. If counter 802 is not cleared, an output is generated to reset pulse generator 802. A specific key sequence must be written to a Watchdog Key Register 804 by the CPU 200 within this 2 seconds after reset, and within 2 seconds of the previous update to prevent time-out.

The key sequence is a two stage function starting from reset. The watchdog timer starts in stage one, waiting for a write to the Watchdog Key register. If the value written to the Watchdog Key Register is anything but an A5H, a system reset is generated (just as if the terminal count had been reached). If the write was an A5H, stage two is entered. In stage two, the watchdog timer waits for another write. If the write is a 5AH, the timer is reset and stage one is re-entered. If the write is something other than a 5AH, a system reset is generated.

The watchdog timer has a hardware pin-strapable disable mode, allowing the watchdog to be disabled for software development. When the WDTDISABLE pin is tied low, the watchdog timer is enabled. When tied high, the watchdog timer is disabled.

Figure 9:
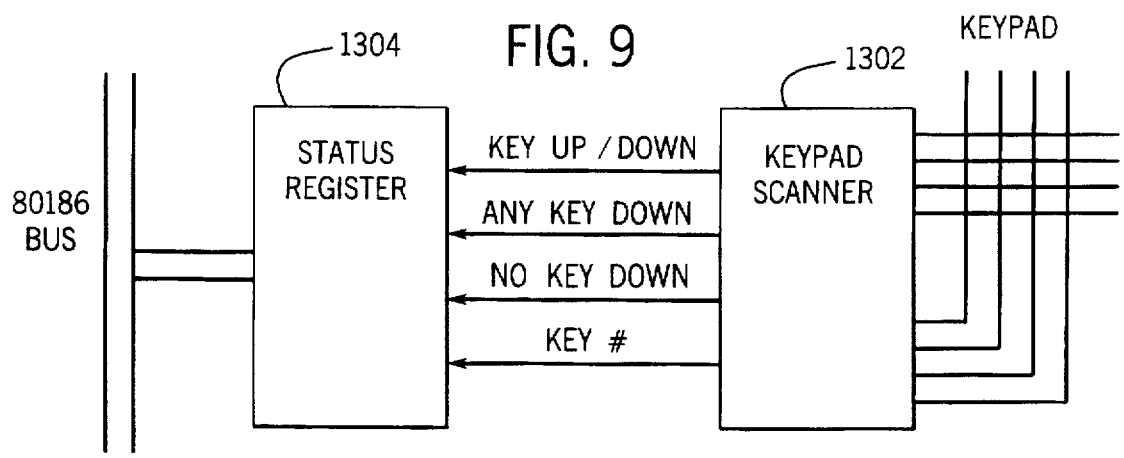
FIG. 9 is a block diagram showing the keypad scanner of the keypad interface of FIG. 2.

The keypad interface 1300 (FIG. 2) includes a keypad scanner 1302, shown in FIG. 9. The scanner 1302 supports keypads with up to 25 keys. The scanner works autonomously from the CPU 200. Keypad activity is detected and reported via a status register 1304 mapped into the CPU's address space. Interrupts are generated when a key is depressed and when it is released. Activity is debounced on both depression and release. A wake-up signal is generated if keypad activity is detected when the MSC is in shut-down or idle modes. An error code is generated if multiple keys are depressed.

The following functions are performed by the keypad scanner 1302: detection of keypad activity, determination of the identity of the key closure, debouncing of the key down and a key up transitions, generations of a direct interrupt to the CPU 200. The status of the keypad is reported via a register mapped into cpu 200 user address space. This status includes a not key down code (00000000), a multiple keys down code (XXXXXXX1), and codes for each of the keys (RRKKKKK0); R=reserved, K=key code and X=don't care. A maskable interrupt is generated when the visible register changes. The keypad scanner is designed to operate in a static state when no activity is present, waking-up automatically upon the detection of activity.

The serial I/O, display interface 1400 (FIG. 2) is a three-wire bus allowing the CPU 200 to talk to external serial devices, such as LCDs. The three-wire serial bus (clock, data in, and data out) is provided for communicating with the display module and any other serially controlled device that the user requires, such as a serial EEPROM. The serial bus is a peripheral to the CPU 200 and is solely under the control of user software. The protocol used by the serial bus is to be specified by the user. If multiple devices are connected to the bus, the parallel I/O port can be used to provide the required chip select function. The serial bus can be disabled via software to reduce power consumption. When the communications processor is in shut-down mode, activity on the data input will not wake up the communications processor 100.

The system clock generator 900 produces all clocks internal to the communications processor 100. Dynamic control of clock speeds for reduced power consumption is handled in this block, in concert with the reset/mode control block.

The reset and power mode controller 1200 provides power-on-reset and low voltage detection. Separate reset input and output pins are provided. In addition to the system reset functions, control over the entering and exiting the various operation modes of the MSC is located in this block.

Figure 10:
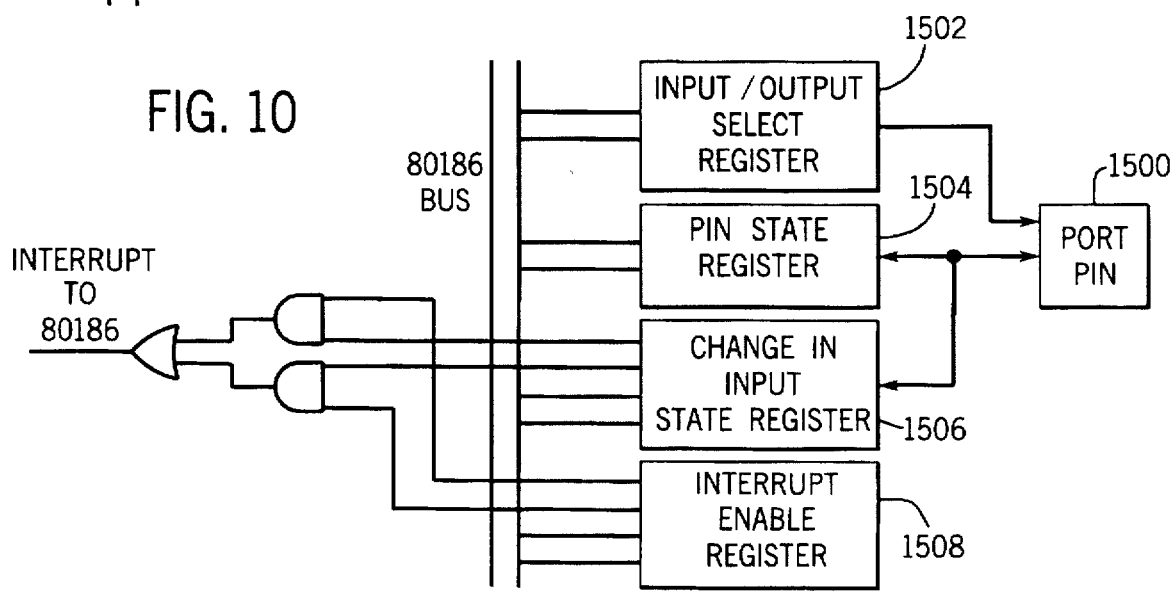
FIG. 10 is block diagram showing the parallel I/O port of FIG. 2.

Parallel I/O ports 1500 are provided as general purpose I/O pins which can be programmed as either an input or an output. The logic state of each output is programmable by the CPU 200 by setting input/output select register 1502 (FIG. 10).

Pins programmed as Inputs report both the current status at the pin, as well as an indication that the pin has changed state from a high to a low since last read. A single maskable interrupt is generated to the CPU 200 when any input changes state from a high to a low. This interrupt is maskable on a bit by bit basis. At reset, all pins are inputs, and the interrupt is disabled.

The state of pins programmed as outputs directly reflects the logic level programmed into register 1504 by the cpu 200.

Control/Status Registers—Four types of registers are utilized, all of which are mapped into cpu 200 address space. The first type of register 1502 has a bit for each pin, controlling whether that pin is an input or an output. The second type 1504 contains a bit for each pin. These bits present the current state of input pins, and set the state of output pins. The third type 1506 contains one bit per pin, reporting whether each input has changed state since the register was last read. The last type of register 1508 provides an interrupt enable bit for each pin. The parallel port interrupt is a direct interrupt, fed straight to the CPU 200.

The system test logic block 100 provides hardware for performing system tests on the telephone. These tests are determined based on the algorithm being supported.

Figure 11:
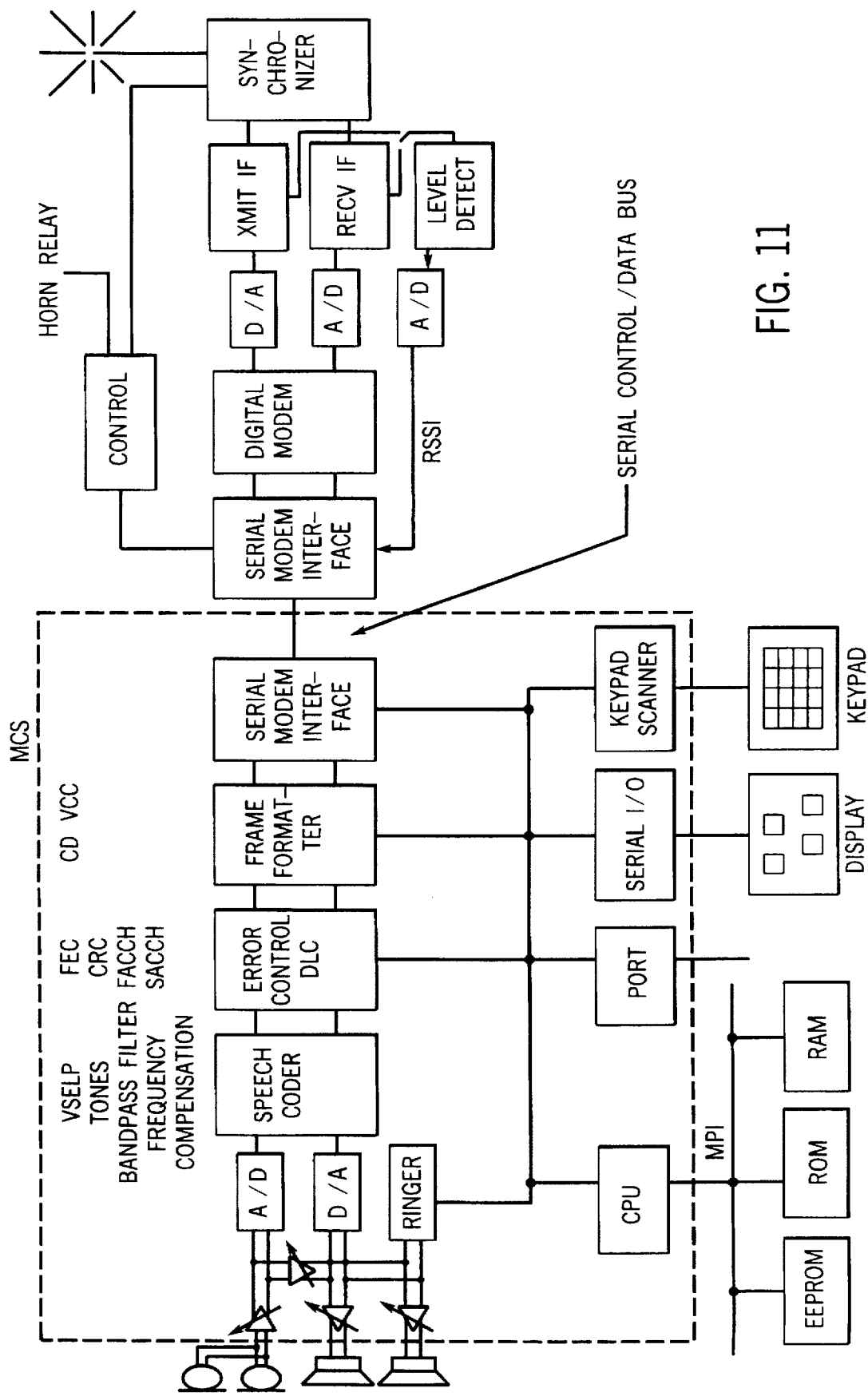
FIG. 11 is a functional block diagram showing the communications processor used to implement a digital mode cellular telephone application.

The role of the communications processor 100 can best be shown with reference to drawing of a typical IS-54 cellular telephone. FIG. 11 shows the functions required for an IS-54 telephone operating in digital mode (GSM operation is similar to this drawing, with the exception that the speech and signalling algorithms are different). The communications processor 100 performs the functions within the dashed box.

Figure 20:
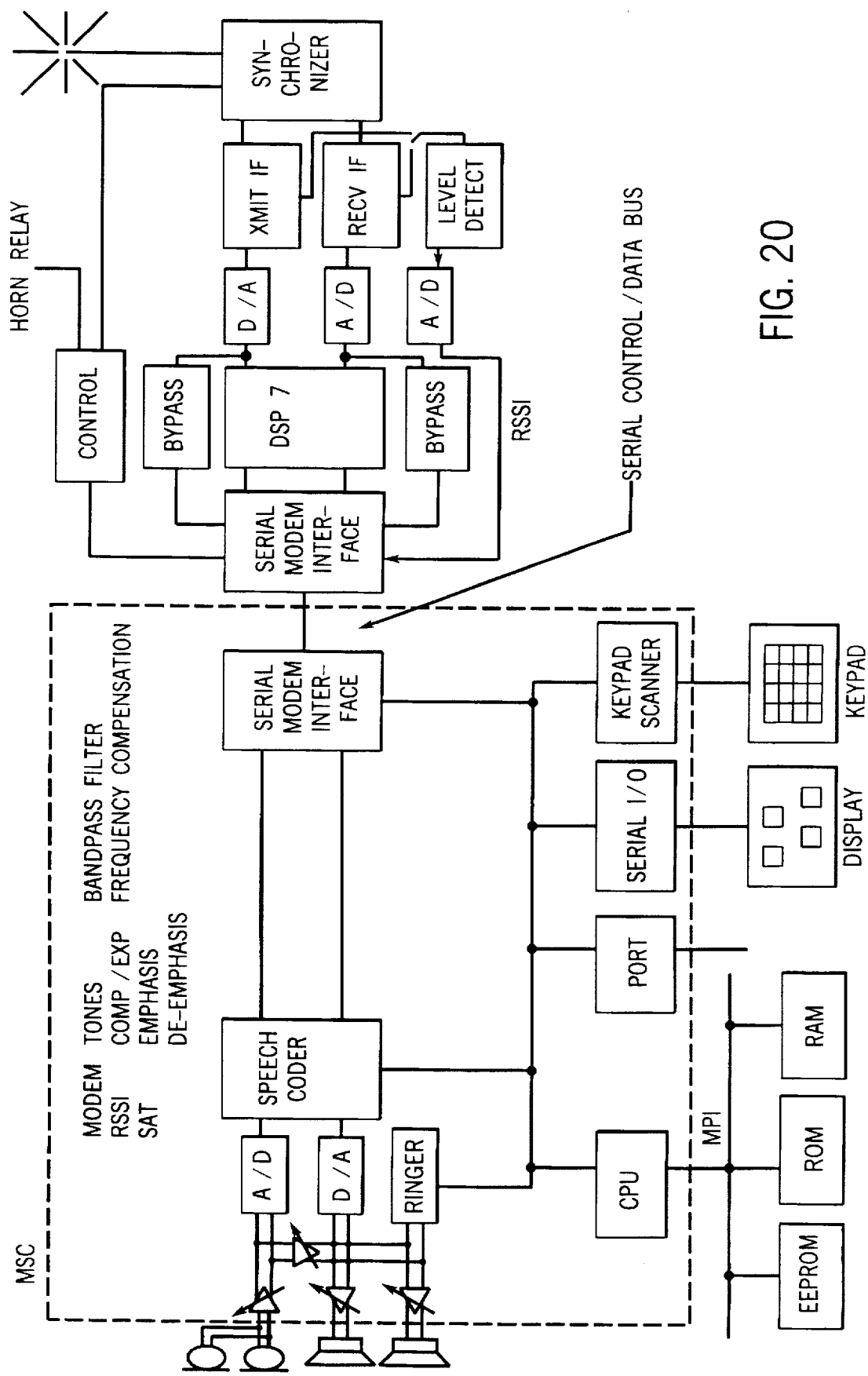
FIG. 20 is a block diagram showing the communications processor implementing an analog mode operation.

FIG. 20 shows the telephone functions for analog operating mode. In this mode, the communications processor performs the all of the required speech and control functions. It is interesting to note that communications processor 100 processes the speech and control signals using the same DSP resources used for the digital mode. The A/D and D/A converters present in the digital mode DQPSK modem are used in the analog mode to convert the analog signal present at the radio to and from a digital format. This reduces the duplication of hardware that would otherwise be required for dual-mode operation.

Figure 12:
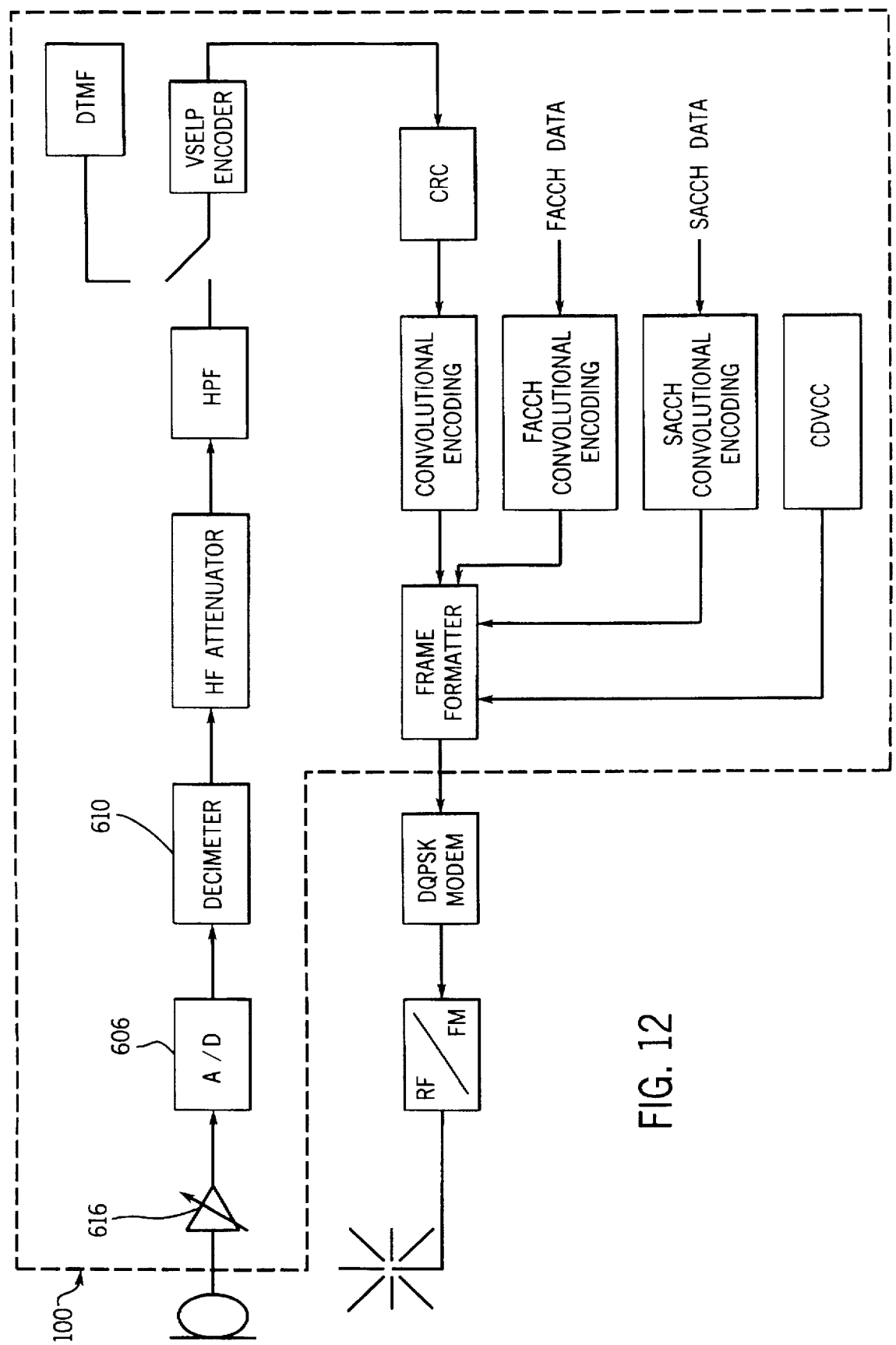
FIG. 12 is a functional block diagram showing the digital transmit signal flow of the processor configured as in FIG. 10.

FIG. 12 shows the transmit path for digital speech processing using the present invention. This figure shows:

Analog Gain Block 616, A/D 606, Decimator 610—These blocks amplify the input from the microphone(s), digitize it, and decimate it.

Hands-Free Attenuator (HF Attenuator)—This is a programmable attenuator under the control of the hands-free unit which may be provided, if desired.

High-Pass Filter (HPF)—This is a high-pass filter with a 120 Hz cut-off.

DTMF—DTMF tones to be transmitted are injected into the signal path here by DTMF block. These tones can also be generated by the base station.

VSELP Encoder—The speech compression algorithm is performed by this block.

CRC—A CRC is calculated for the 12 most perceptually significant bits of each encoded block of speech.

Convolutional Encoding—A ½ convolution code is used to process the 77 class 1 bits of each block of speech.

FACCH Convolutional Encoding—When FACCH data is transmitted instead of speech, it is processed through a ¼ convolution coder.

SACCH Convolutional Encoding—SACCH data is processed through a ½ convolution coder.

CDVCC—The 12-bit CDVCC is constructed using a 12.8 hamming code, and passed to the frame formatter as a serial bit stream.

Frame Formatter—The CDVCC, SACCH, and speech/FACCH bit streams are arranged into frames for transmission along with guard time, ramp time, and sync bits.

DQPSK Modem—The bit stream from the frame formatter is converted to an analog format via the DQPSK modem.

RF/FM Modulator—This block is the "radio", providing FM modulation and RF functions.

Figure 13:
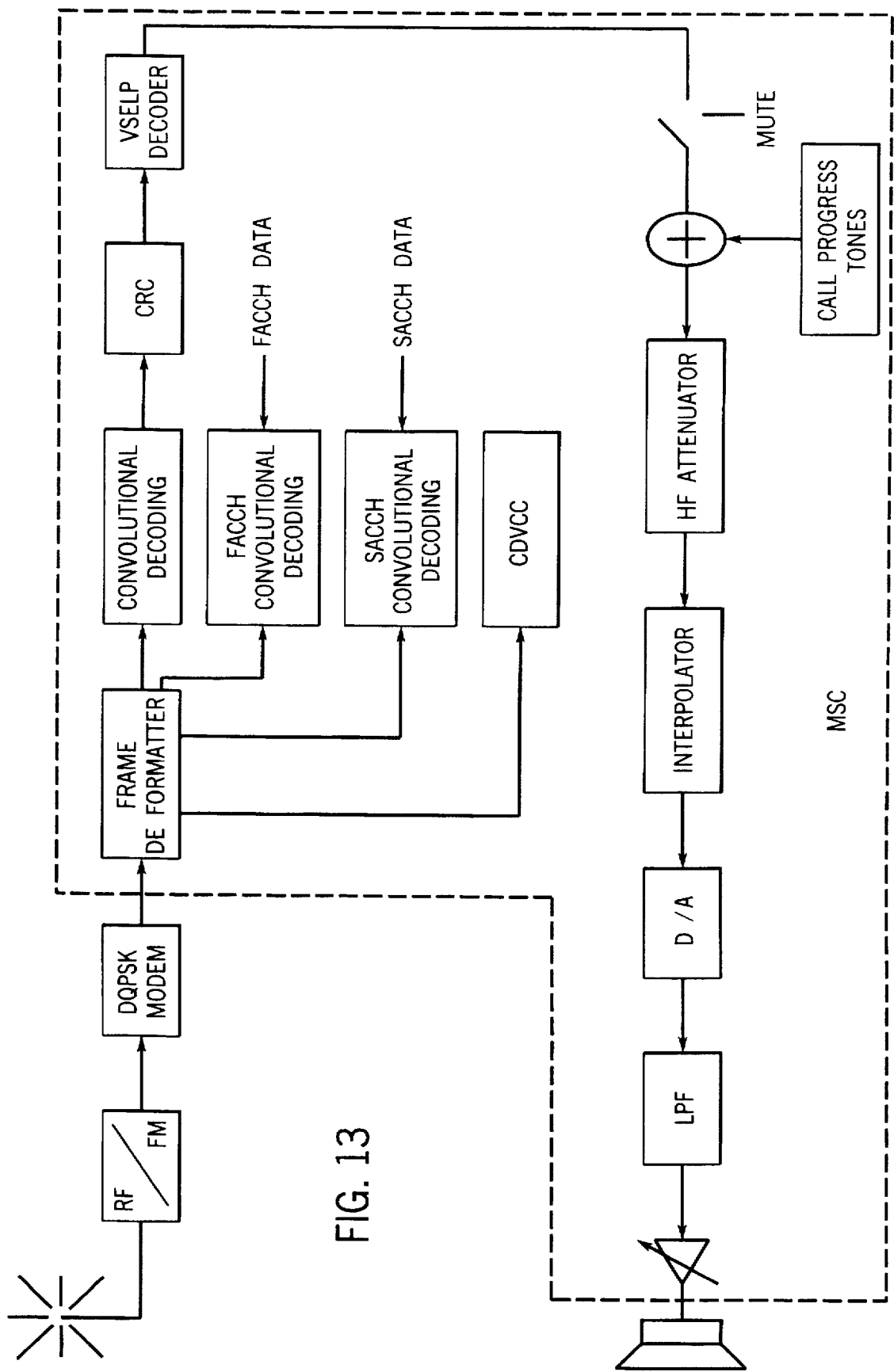
FIG. 13 is a functional block diagram showing the digital receive signal flow of the processor configured as in FIG. 10.

The receive path for digital speech processing is shown in FIG. 13. In this figure:

RF/FM Demodulator—This block is the radio receiver, providing RF and FM Demodulation functions.

Differential Quadrature Phase Shift Keying (DQPSK) Modem—The output of the radio is converted into a digital bit stream by a DQPSK modem.

Frame de-Formatter—The bit stream from the modem consists of frames. The frame de-formatter separates each frame into SACCH, CDVCC, and speech/FACCH data. Additionally, slot synchronization is detected in this block.

Convolutional Decoder—The 178 bits of encoded class 1 speech data are processed through a ½ convolution decoder.

FACCH Convolutional Decoder—If present, FSACCH data is processed through a ¼ convolution decoder.

SACCH Convolutional Decoder—SACCH data is processed through a ½ convolution decoder.

CDVCC—Hamming encoded (12,8 code) CDVCC is decoded in this block.

CRC—A 7-bit CRC was appended to the 12 most perceptually significant class 1 speech bits before they were convolutionally encoded by the base station transmitter. This CRC field is checked by this block.

VSELP Decoder—The VSELP speech expansion algorithm is processed by this block.

Mute—Under certain conditions the voice signal must be muted. Any transients created either entering or leaving mute must meet specified amplitude and duration requirements.

Call Progress Tones—Tones such as dial tone and DTMF are generated to provide user feedback. These tones are injected into the receive path at this point. Note that the tone generator can also be used to produce the transmit side DTMF signals.

Hands-Free Attenuator—This is a programmable attenuator under the control of the hands-free unit.

Interpolator, D/A, LPF, Analog Gain Stage—The interpolator, D/A, and low-pass filter recreate the analog audio signal, which is amplified by the programmable gain output driver(s).

SPEECH PROCESSING (IS-54)

Figure 7:
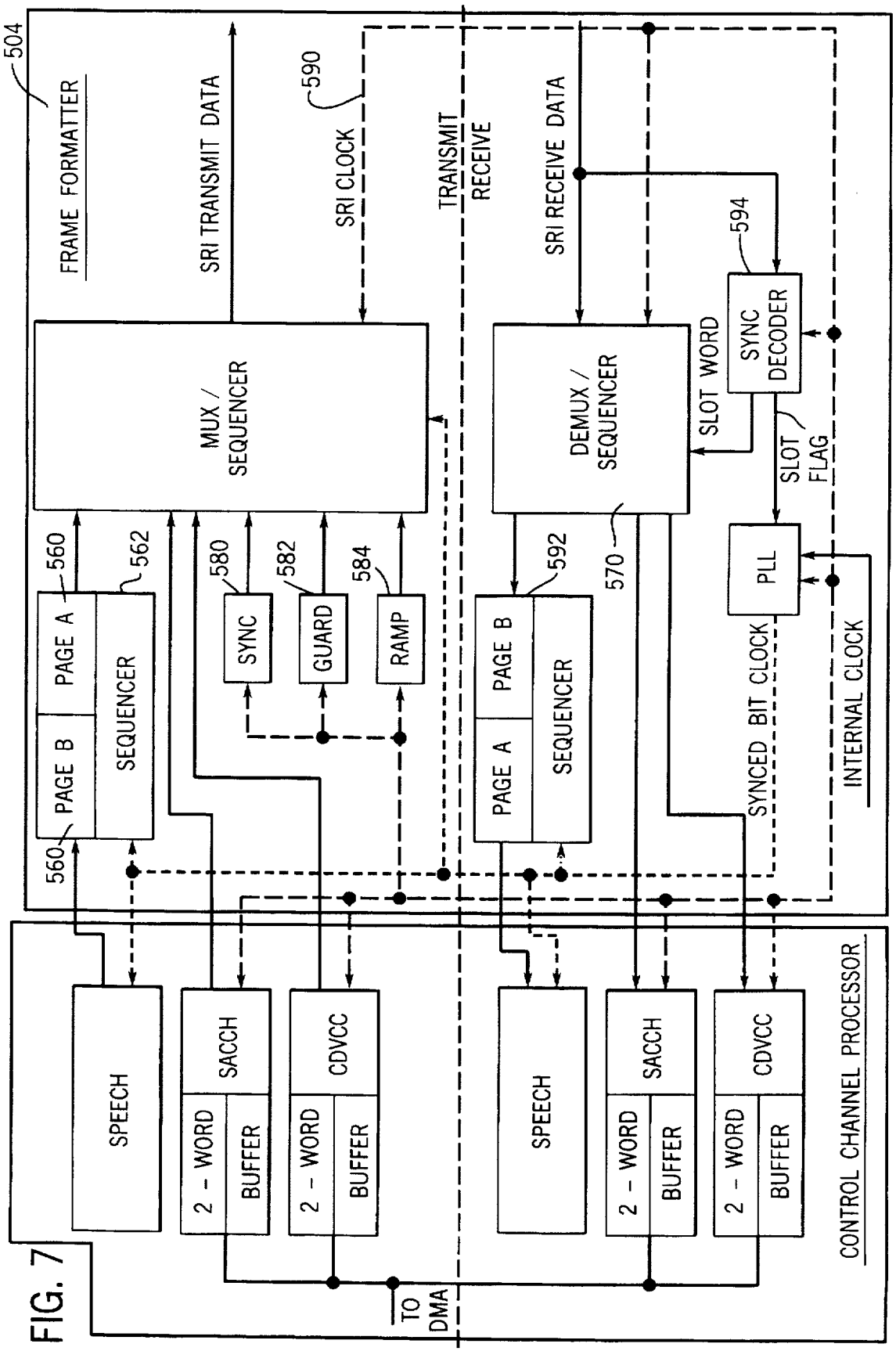
FIG. 7 is a block diagram showing the frame formatter of FIG. 2.

Introduction—The speech coding algorithm belongs to a family of speech coders known as Code Excited Linear Predictive (CELP) Coders. Such methods employ codebooks to vector quantize the excitation (residual) signal and use an analysis-by-synthesis approach to determine which code to use to represent the excitation. The algorithm used is a variation on CELP called Vector-Sum Excited Linear Predictive (VSELP) Coding which employs a codebook structure which is predetermined. Such techniques reduce significantly the overall codebook search process. The algorithm requires both encode and decode functions which employ traditional LPC synthesis methods shown in FIG. 7.

CELP Synthesizer

Figure 14:
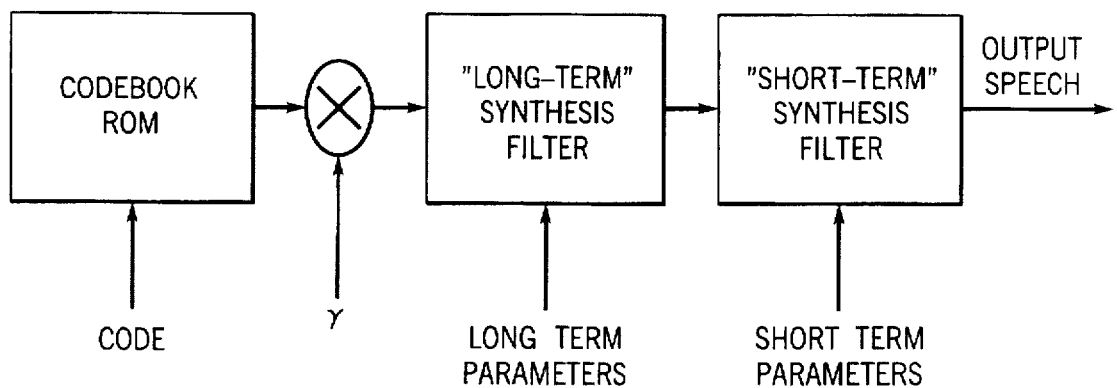
FIG. 14 is a flow diagram showing a basic code excited linear prediction (CELP) process.

FIG. 14 shows the basic speech CELP synthesis routine. The CELP synthesizer in the decoder uses a received code to determine which excitation vector from the codebook to use. The codebook contains 128 vectors each of length 40 samples, these vectors being typically random white gaussian variables. The vector chosen is scaled by a gain term gamma, and applied to a set of linear filters to obtain 40 samples of reconstructed speech. The filters include a "long-term" or "pitch" filter which inserts periodicity into the excitation. The output of the "long-term" filter is applied to the "short-term" or "formant" filter which adds the spectral envelope to the signal.

"Long-term" Filter—The long-term filter incorporates a single-tap predictor which attempts to predict the next output sample from one past sample. The transfer function is given by $$B(z) = \frac{1}{1 - bz^{-1}}$$

where B(z) is characterized by the quantities b and L. L is called the "lag" and for voiced speech would typically be the pitch period or a multiple of it. The parameter b is the "long term" predictor coefficient.

"Short-term" Filter—The short-term filter incorporates a short-term predictor which attempts to predict the next output sample from the previous 10 output samples. This filter is equivalent to the traditional LPC synthesis filter and has a transfer function given by $$A(z) = \frac{1}{1 - \Sigma(a[i]z^{-i})}$$

for $i = 1$ to $10$

The "short-term" filter is characterized by the $a[i]$ parameters, which are the direct form filter coefficients for the all pole "synthesis" filter.

Parameter Update—The various parameters (code, gain, filter coefficients) are not all transmitted at the same rate to the synthesizer. The "short-term" parameters are updated at the "frame" rate while the "long-term" parameters are updated at the "subframe" rate. A frame is composed of 4 subframes where a subframe is composed of 40 samples and the sampling rate is 8 KHz.

Short-term Predictor Parameters—The short-term predictor parameters are the $a[i]$'s of the short-term filter. These are standard LPC direct form filter coefficients and are generated by an LPC analysis technique called fast fixed-point covariance lattice algorithm known as FLAT. It has the advantage of lattice algorithms including guaranteed filter stability, non-windowed analysis, and the ability to quantize the reflection coefficients within the recursion.

Figure 8:
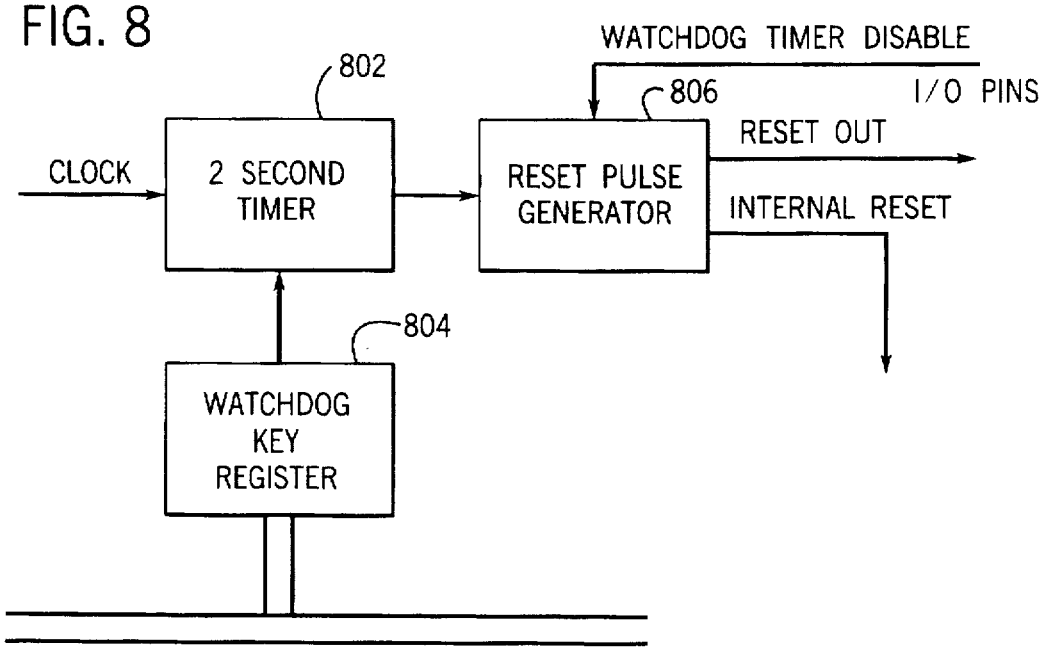
FIG. 8 is a block diagram showing the organization of the watch dog timer of FIG. 2.

Analysis-by-synthesis—The codebook search procedure consists of trying each codevector as a possible excitation for the CELP synthesizer which is shown in the FIG. 8. The synthesized speech s'(n) is compared against the input speech and a difference signal is generated. This difference signal is then filtered by a weighing filter, W(z), to generate a weighted error signal. The power in the error signal, e(n), is computed and the codevector which produces the minimum weighted error power is chosen as the codevector for that subframe.

Figure 15:
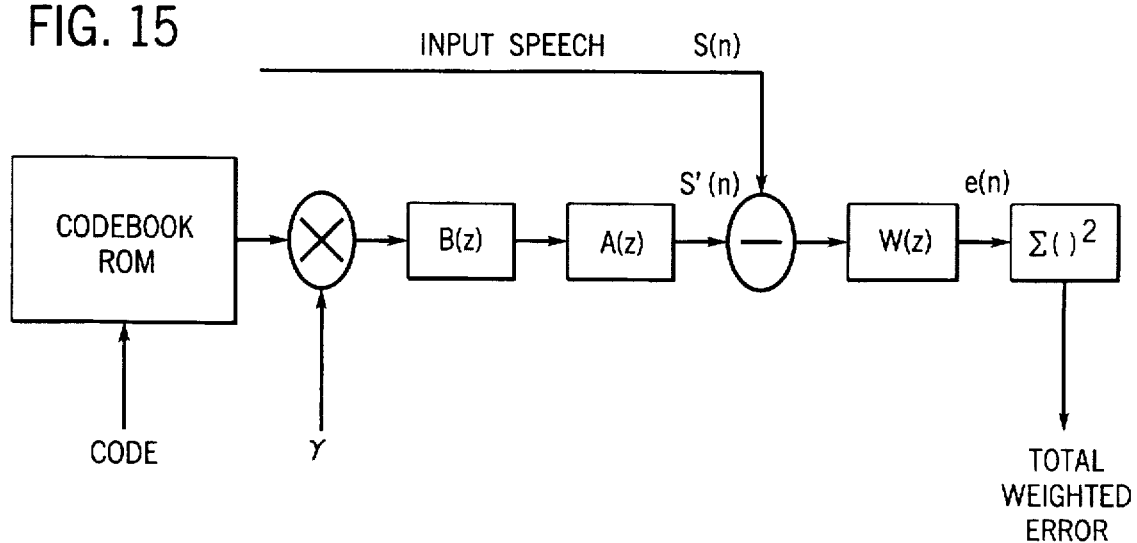
FIG. 15 is a flow diagram showing a codebook search procedure used in a CELP process.

FIG. 15 shows the routing for carrying out the CELP codebook search. In FIG. 15 the following are depicted:

Weighing Filter W(z)—The weighing filter serves to weight the error spectrum based on perceptual considerations. It is a function of the speech spectrum and is expressed in terms of the $a[i]$ parameters of the "short-term" (spectral) filter.

$$W(z) = \frac{1 - \Sigma(a[i]z^{-i})}{1 - \Sigma(a[i]f^iz^{-i})}$$

The parameter which defines the amount of error weighing is f, which controls the amount of error to be allowed in the formant regions of the speech signal. In this implementation, f=0.8.

Figure 16:
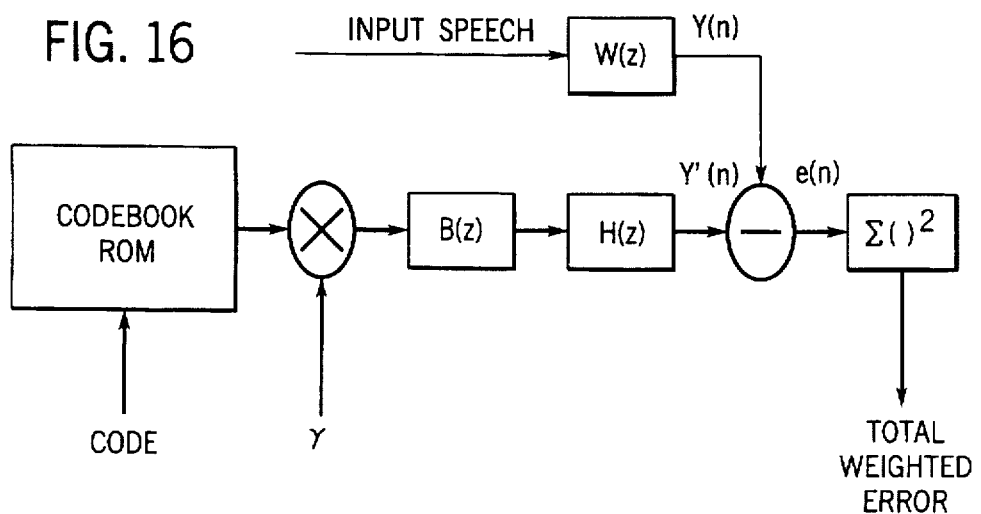
FIG. 16 is a flow diagram showing a revised codebook search procedure.

A revised CELP codebook search is shown in FIG. 16. The weighing filter is moved from both input paths to the subtracter giving the equivalent configuration shown in FIG. 16. Here H(z) is a combination of A(z), the short-term (spectral) filter and W(z), the weighing filter. These filters are combined since the denominator of A(z) is canceled by the numerator of W(z).

$$H(z) = \frac{1}{1 - \Sigma(a[i]f^iz^{-i})}$$

Gain Optimization—Instead of determining the gain parameter prior to the codebook search based on residual energy, a method which would fix the gain for the entire search, an approach is chosen which optimizes the gain for each codevector and yields better results. The codevector which yields the minimum weighted error is chosen and its corresponding optimal gain would be used for. This implies that the gain term must be updated at the subframe rate.

Codevector Construction—The VSELP coder uses an excitation codebook of $2^7$ codevectors which is constructed from 7 basis vectors. Defining vm(n) as the m'th vector and ui(n) as the i'th codevector in the codebook, then $$ui(n) = SUM\{gim*vm(n)\}$$
$$u_i(n) = \Sigma\{g_{im}XC_m(n)\}$$
for m = 1 to 7; i = 0 to 127; n = 0 to 39 and $gim$ = +1 if bit m of codeword i = 1
       = −1 if bit m of codeword i = 0

In other words, each codevector in the codebook is constructed as a linear combination of the 7 basis vectors. The advantages of the VSELP codebook over random codebooks are Extremely efficient codebook search procedure Low codebook storage requirement More robust to channel errors Efficient joint optimization of the codeword and "lag" coefficient b Bit Allocation—The basic data rate of the speech coder is 7950 bits per second. This is coded up to 13 kilobits per second using forward error correction/detection techniques. There are 159 bits per frame (20 ms) for the speech coder (before error control) which are allocated as follows:

| | | |
|---|---|---|
| Short-term filter coefficients | 38 bits/frame | |
| Frame energy | 5 bits/frame | |
| Lag, L | 7 bits/subframe | 28 bits/frame |
| Codewords | 7+7 bits/subframe | 56 bits/frame |
| b, gamma$_1$, gamma$_2$ vector quantizer | 8 bits/subframe | 32 bits/frame |

Figure 17:
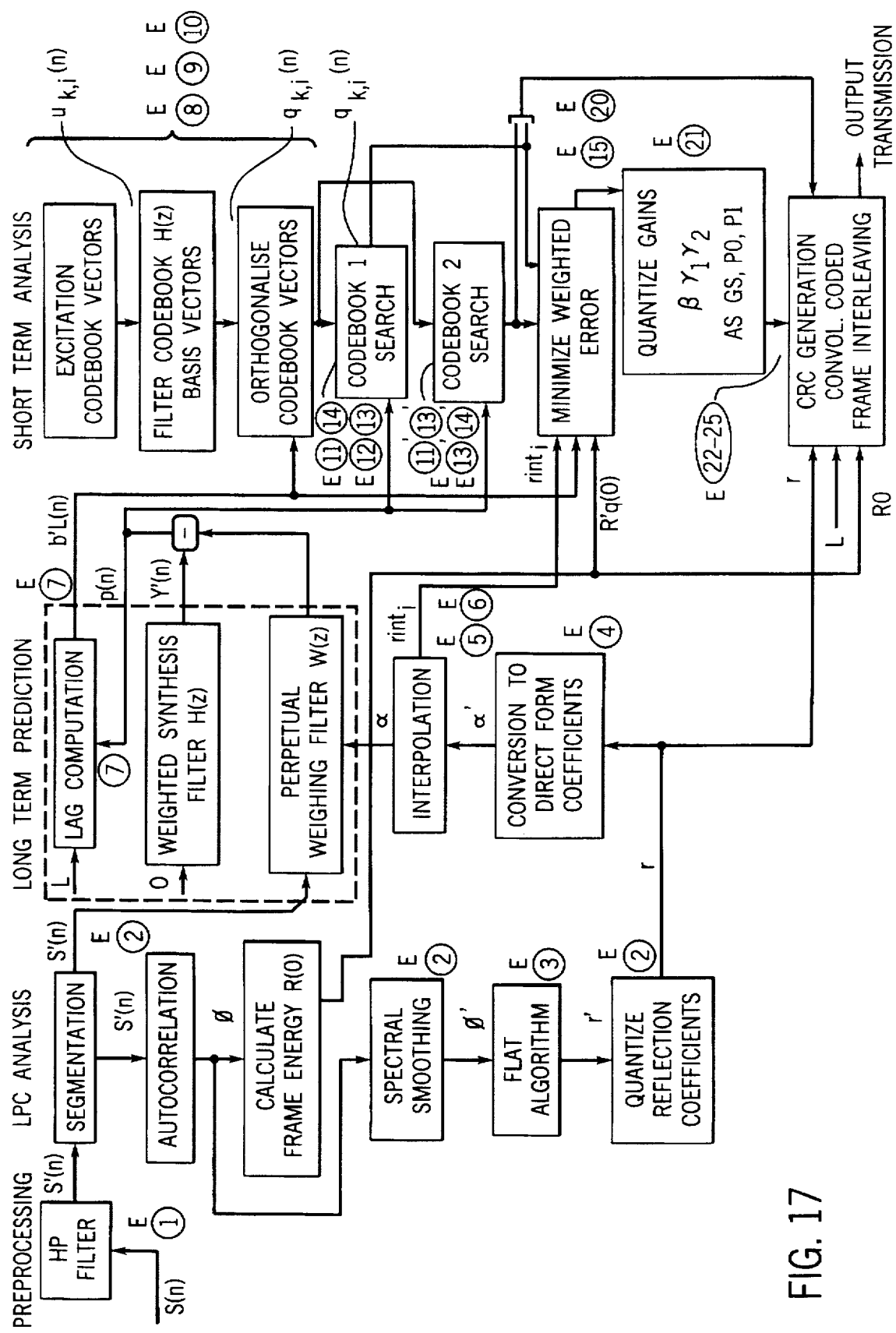
FIG. 17 is a flow diagram showing an implementation of a vector sum excited linear predictive (VSELP) encoder.
Figure 18:
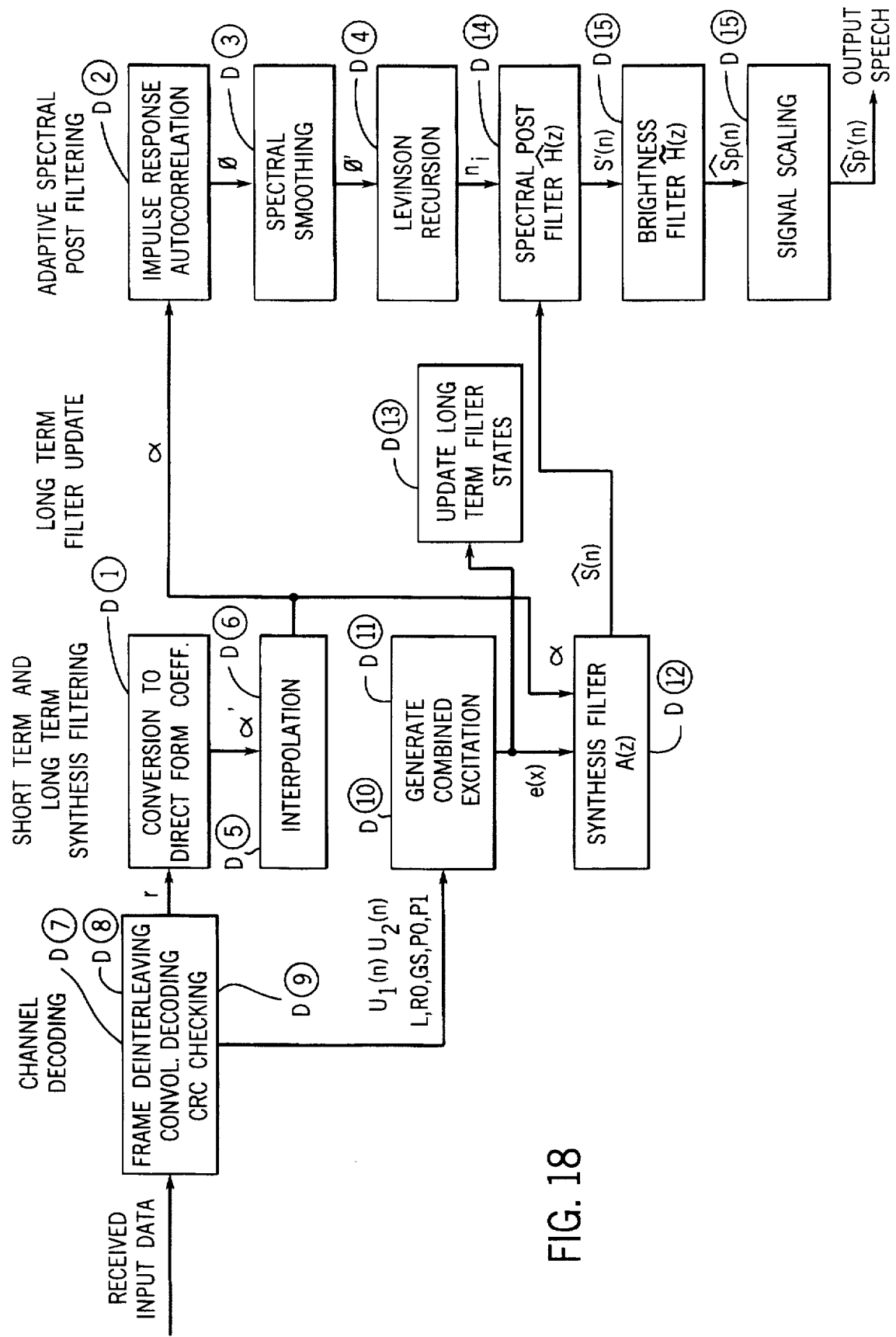
FIG. 18 is a flow diagram showing an implementation of a VSELP decoder.

FIG. 17 shows a flow diagram of the steps to be carried out in executing the VSELP encoding algorithm according to IS-54. FIG. 18 shows the decoding VSELP algorithm of IS-54. A detailed explanation of each of the steps of FIG. 17 and FIG. 18 can be found in the EIA/TIA Project Number 2215 publication "Dual-Mode Mobile Station-Base Station Compatability Standard IS-54" published in December 1989 by the Electronic Industries Association, which is incorporated herein by reference.

Figure 19A:
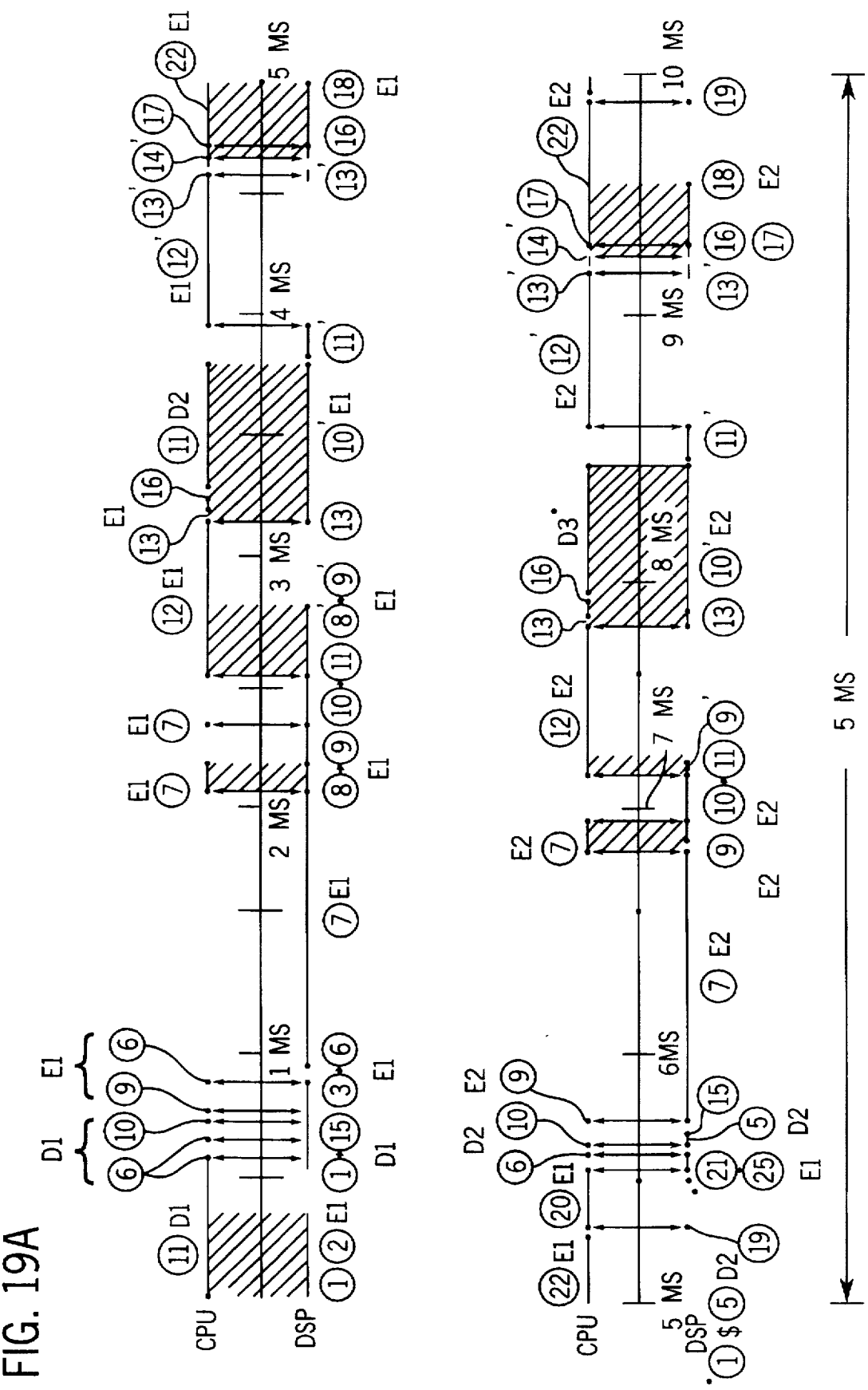

FIG. 19 demonstrates the timing of partitioning of the arithmetic steps required to carry out the steps of FIGS. 17 and 18. Table 1, below:

TABLE 1

| No | Function Encoder E / Decoder D | No. of Arithmetic Operations DSP | CPU | Frame/Subframe F/SF | Comments |
|---|---|---|---|---|---|
| E① | High Pass Filter | 1440 | | F | 160 samples |
| E② | Autocorrelation & Windowing | 1870 + 55 | | F | |
| E③ | Covariance Lattice Algorithm | 1475 | 10 | F | |
| E④ | Convert r$_i$ to α$_i$ | 45 | | SF | |
| E⑤ | Interpolate α$_i$ | 20* | | SF | *subframes 1, 2, 3 only |
| E⑥ | Reconvert to r$_i$ - stability | 90* | 9 | SF | *subframes 1, 2, 3 only |
| E⑦ | Calculate Long-term Predictor Lag | 11556 | 126 | SF | |
| E⑧ | Zero-state Response of each codevector to H(Z) | 2450 | | F | Codebook 1 search |
| E⑨ | Interpolate zero-state response | 280* | | SF | *subframes 1, 2, 3 only |
| E⑩ | Orthogonalise codevectors | 600 | 1 | SF | |
| E⑪ | Calculate Rm, Dmj | 280 + 1120 | | SF | |

TABLE 1-continued

| No | Function Encoder E / Decoder D | No. of Arithmetic Operations DSP | CPU | Frame/Subframe F/SF | Comments |
|---|---|---|---|---|---|
| E⑫ | Calculate Ci, Gi, Cu, Gu | | 616 | SF | |
| E⑬ | Calculate $Ci^2G_{best}$ & $C_{best}^2Gi$ | 192 | | SF | |
| E⑭ | Compare values | | 64 | SF | End of codebook 1 search |
| E⑧' | as ⑧ for codebook 2 | 2450 | | F | Codebook 2 search |
| E⑨' | as ⑨ for codebook 2 | 280 | | SF | *subframes 1, 2, 3 only |
| E⑩' | Orthogonalise codebooks 1 and 2 | 6320 | 8 | SF | |
| E⑪' | as ⑪ for codebook 2 | 280 + 1120 | | SF | |
| E⑫' | as ⑫ for codebook 2 | | 616 | SF | |
| E⑬' | as ⑬ for codebook 2 | | 192 | SF | |
| E⑭' | as ⑭ for codebook 2 | | 64 | SF | End of codebook 2 search |
| E⑮ | Calculate Rec, Rx(i) | 240 + 40 | | SF | Gain Quantisation |
| E⑯ | Calculate RS, Rpc | 22 + 120 | | SF | |
| E⑰ | Calculate a,b,c,d,e,j,g,h,i | 21 | 3 | SF | |
| E⑱ | | | | | |
| E⑲ | Gain error minimisation | 2304 | | SF | |
| E⑳ | Compare gain error values | | 255 | SF | |
| E㉑ | Calculate $\beta_q$ $\gamma_{1q}$ $\gamma_{2q}$ | 3 | | SF | |
| E㉒ | Generate selected codevectors | | 560 | SF | |
| E㉓ | Generate combined excitation | 120 | | SF | |
| E㉔ | Update weighted synthesis Filter | 400 | | SF | |
| E㉕ | Update long-term Filter states | | | SF | Address pointer update |
| D① | Convert $r_i$ to $\alpha_i$ | 45 | | SF | |
| D② | Autocorrelate Postfilter impulse resp. | 55 + 55 + 10 | | F | Subframe 4 only, item interpolate |
| D③ | Binomial Windowing of Autocorr. | 10 | | F | |
| D④ | Levinson Recursion ($\eta$) | 110 | 10 | F | |
| D⑤ | Interpolate $\alpha_i$ | 20* | | SF | *subframes 1, 2, 3 only |
| D⑥ | Convert to $r_i$ - stability | 90* | 9 | SF | *subframes 1, 2, 3 only |
| D⑦ | Calculate Rq(o) Frame energy | | | SF | |
| D⑧ | Interpolate Frame energy | | 1 | SF | |
| D⑨ | Calculate RS | 22 | | SF | |
| D⑩ | Transform GS,PO,Pq to Pq $\gamma_{1q}$ $\gamma_{2q}$ | 40 + 9 | 3 | SF | |
| D⑪ | Generate combined excitation | 120 | 560 | SF | |
| D⑫ | Update synthesis filter A(z) | 400 | | SF | |
| D⑬ | Update long-term filter states | | | SF | Address pointer update |
| D⑭ | Update spectral post filter | 840 | | SF | |
| D⑮ | Signal scaling | 122 | 2 | SF | | shows the number of arithmetic operations needed to execute these various steps of FIGS. 17 and 18. The circled numerals in Table 1 correspond to the circled numerals in FIG. 19 and in FIGS. 17 and 18. In each case a numeral in conjunction with the letter E indicates an encoding operation while a number in conjunction with a D indicates a decode operation. Also, some processing steps are performed at frame rates and others are performed at subframe rates. The digital speech data according to IS-54 is divided into 160 sample frames 20 ms long. It can therefore be seen that FIG. 19 represents one frame period of 20 ms with each line in FIG. 19 representing one subframe period of 5 ms. Operations such as the long term prediction computations are performed once for each frame. Short term analyses, on the other hand are carried out once for each subframe. Table 1 makes this distinction by showing a "F" for frame rate operations and an "SF" for subframe operations. FIG. 19 indicates this difference by placing a numeral next to the the D or E for subframe rate operations. For example, "E1" means the operation is being performed for the first subframe. "E2" means the operation is being performed for the second subframe, etc.

FIG. 19 is a time graph divided into four time lines of 5 ms each. Points or lines above the main time line indicate operation of the CPU and points or lines below the main time line indicate operation of the DSP of MAC engine. Cross harching indicates simultaneous operation of the CPU and DSP. The operations are partitioned here so that multiply or multiple and accumulate operations are performed by the DSP, which is adapted for such calculations due to its hardware multipliers, hardware do loops, etc. Other operations, such as additions, subtractions, divides, square roots, exclusive ORs, look-up tables and compares are performed by the CPU. The execution of these partitioned operations is scheduled to take advantage of as much simultaneous operation of the CPU and DSP as is feasible in order to reduce the total time required to execute the entire procedure. It will be understood by reference to the figures that this means some of the calculations are preformed before they are actually required.

The partitioning and scheduling demonstrated by FIG. 19 permit the VSELP algorithm to be performed effectively and efficiently using conventional clock rates and yet leaves ample time for the CPU to process user programmed routines.

The communications processor 100 can also be used to handle convention analog cellular commincations. The IS-54 is a dual mode standard, providing both digital operation and backward compatibility with the existing analog IS-3 standard. As a result, two complete control and voice mechanisms must be supported.

The approach chosen takes advantage of the high bandwidth A/D and D/A resources required in the digital modem (digital voice operation) to convert the analog mode signal into digital form. Once the analog signals have been digitized, the DSP resources required in digital mode can be used to process the speech (emphasis/deemphasis, compression/expansion, etc.) and control (SAT, FSK modem, etc.). The major open architectural decision remaining is the partitioning of these tasks between the DSP engine in the MSC and the DSP engine in the digital modem. While the MSC has the horsepower to perform the required functions, using the digital modem's DSP reduces the data rate required between the communication processor 100 and the digital modem—this is important since this serial channel is carried in the cable between the handset and the radio box in applications where the radio is not built into the handset.

Call Set-Up/Analog Conversation

Since the call set-up functions are essentially the same in IS-54 as those used in IS-3 (same signalling channel format), we can use the same basic architecture for both call set-up and analog conversation.

Figure 21:
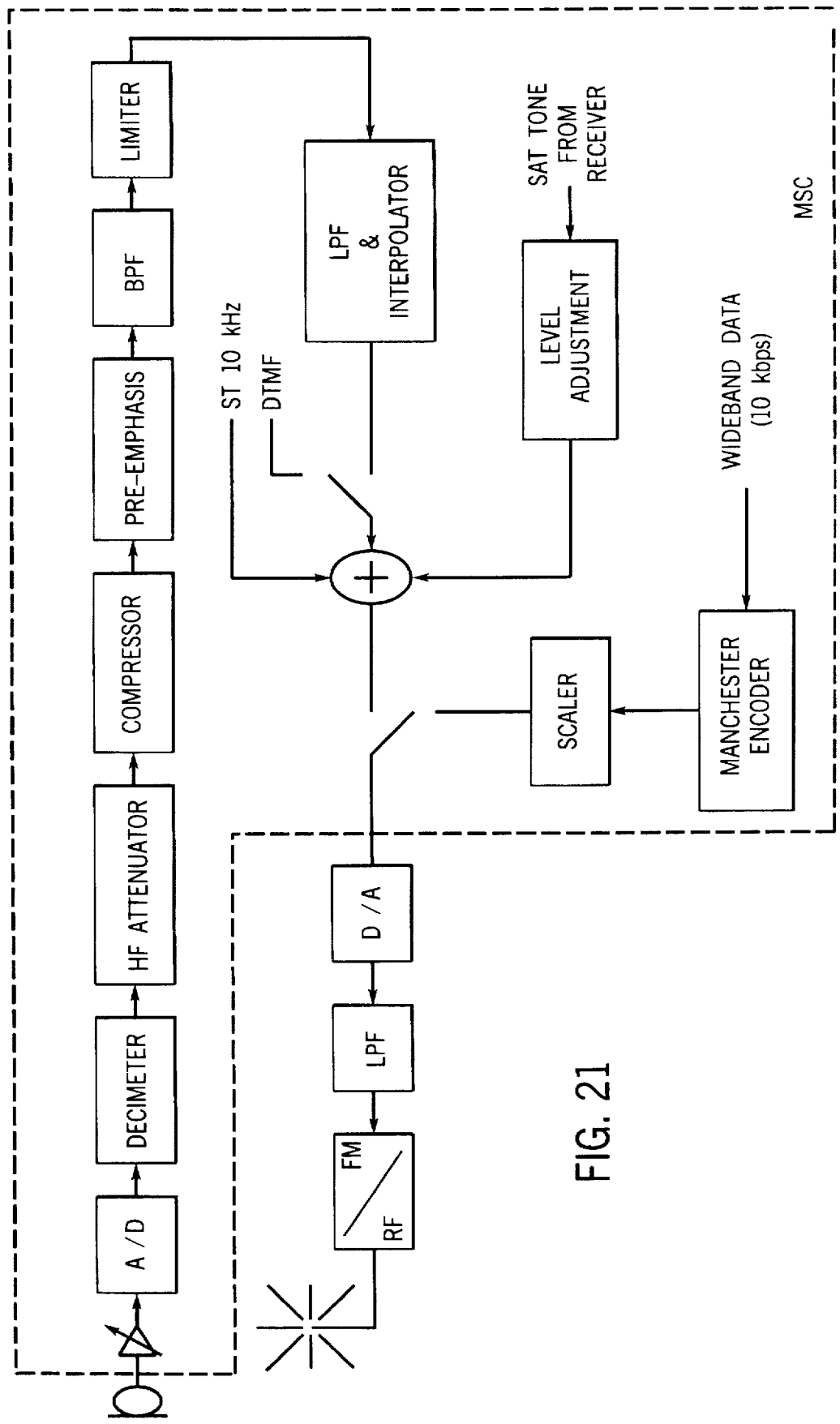
FIG. 21 is a flow diagram showing the analog transmit flow of FIG. 20.

The transmit signal flow is shown in FIG. 20 and the receive signal flow is shown in FIG. 21 for analog operation. FIG. 21 shows the following:

Analog Gain Block, A/D, Decimators—These blocks amplify the input from the microphone(s), digitize it, and decimate it.

Hands-Free Attenuator—This is a programmable attenuator under the control of the hands-free unit.

Compressor—This block performs a square-root function on the input data. Specific attach and decay times must be met when responding to steps in input amplitude.

Preemphasis—The preemphasis block provides a +6 dB/octave (20 dB/decade) slope between 300 and 3000 Hz.

Bandpass Filter—This is a standard 300–3400 Hz bandpass filter.

Limiter—The limiter performs a clipping function to limit the maximum amplitude into the modulator, thus limiting the maximum frequency deviation.

Low-Pass Filter/Interpolator—This filter guarantees that any high frequency components generated by the clipping action of the limiter do not exceed the specified limits.

SAT Tone Level Adjustment—The level of the received SAT tone is adjusted to produce the desired frequency deviation. The tone must be phase-locked to the incoming SAT tone. The SAT tone is added to the voice signal.

DTMF—DTMF tones to be transmitted are injected into the signal path here.

Signaling Tone (ST)—The required 10 kHz (nominal) signalling tone is injected here.

Manchester Encoder and Scaler—The logic high and low signals are scaled to produce the required ±8 kHz frequency deviation of the carrier. This scaling is digitally, with the resulting signal injected prior to the D/A converter.

D/A and Low-Pass Filter—D/A converter and reconstruction filter. Includes interpolation.

Figure 22:
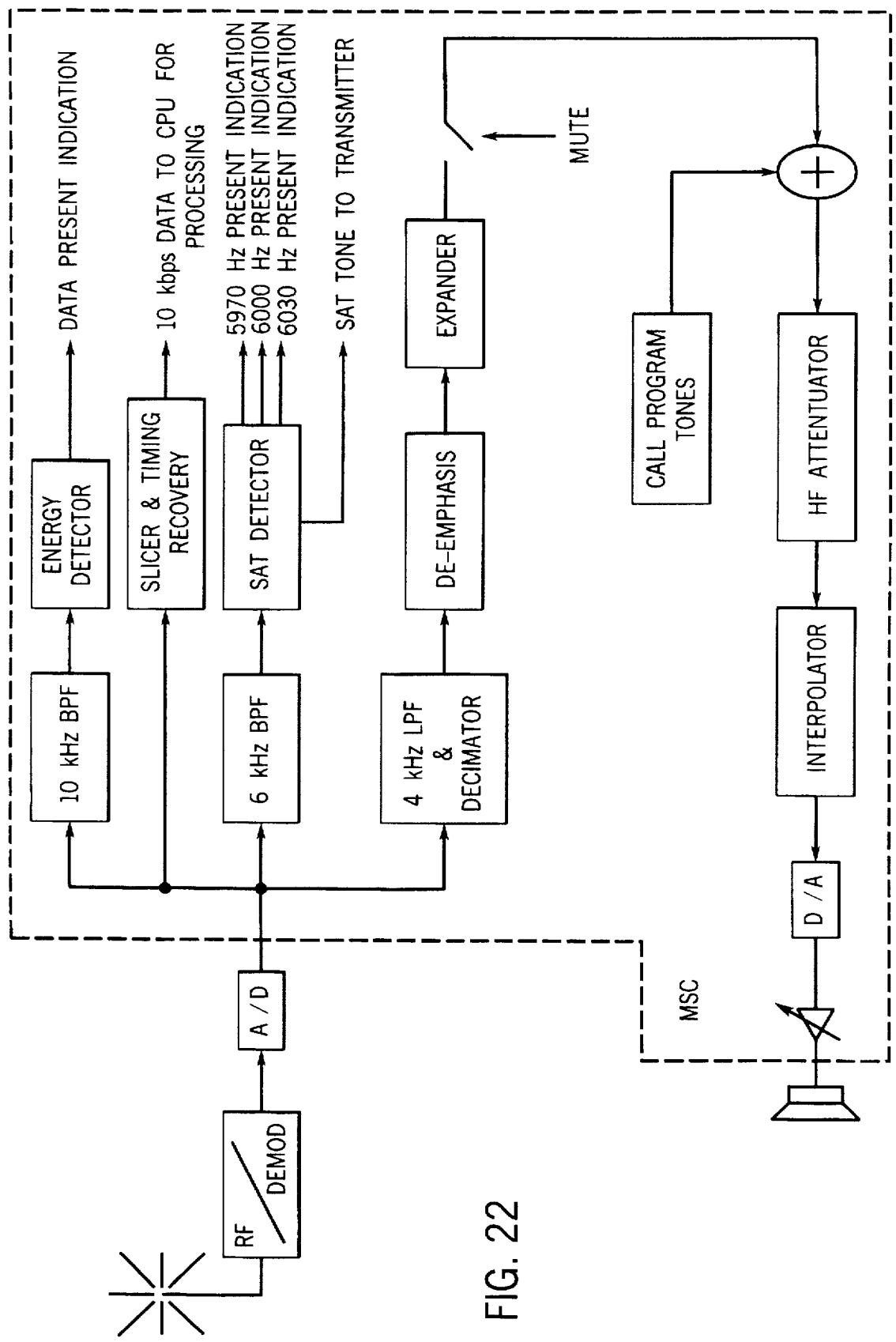
FIG. 22 is a flow diagram showing the analog receive flow of FIG. 20.

RF/FM Modulator—This block is the "radio", providing FM modulation and RF functions FIG. 22 shows the following:

RF/FM Demodulator—This block is the radio receiver, providing RF and FM Demodulation functions.

A/D Converter—Analog to digital converter; includes decimation.

10 Khz Bandpass Filter—This filter detects the presence of a 10 kbps Manchester encoded binary signal (wideband signalling data). This filter is followed by a block that performs detection of bit and word synchronization. Presence of this signal precludes voice or SAT, and vice versa.

6 KHz Bandpass Filter—Bandpass filter centered at 6000 Hz to separate out and detect the presence of SAT tones.

SAT Detector—This block discriminates between three SAT tones, generating an indication of the presence, or the absence of any SAT tone within 250 ms. This detection must be performed at least once every 250 ms. The recovered SAT is sent to the transmitter where it is phase-locked and re-transmitted.

4 KHz Low-Pass Filter/Decimator—Standard voice band limiting filter.

Deemphasis—This block is a network having a −6 dB/octave (−20 dB/decade) slope between 300 and 3000 Hz.

Expander—This block computes the square of the incoming data. Specific attach and decay times must be met when responding to steps in input amplitude.

Mute—Under certain conditions the voice signal must be muted. Any transients crated either entering or leaving mute must meet specific amplitude and duration requirements.

Call Progress Tones—Tones such as dial tone and DTMF are generated to provide user feedback. These tones are injected into the receive path at this point. Note that the tone generator can also be used to produce the transmit side DTMF signals.

Hands-Free Attenuator—This is a programmable attenuator under the control of the hands-free unit.

Interpolator, D/A, Analog Gain Stage—The interpolator and D/A recreate the analog audio signal, which is amplified by the programmable gain output driver(s). These functions are described in more detail in the Audio Interface hardware description section.

Note: The received voice path is inactive when wideband signalling data is being received.

Once a call has been established, the mobile station can be directed to use a digital channel.

Figure 23:
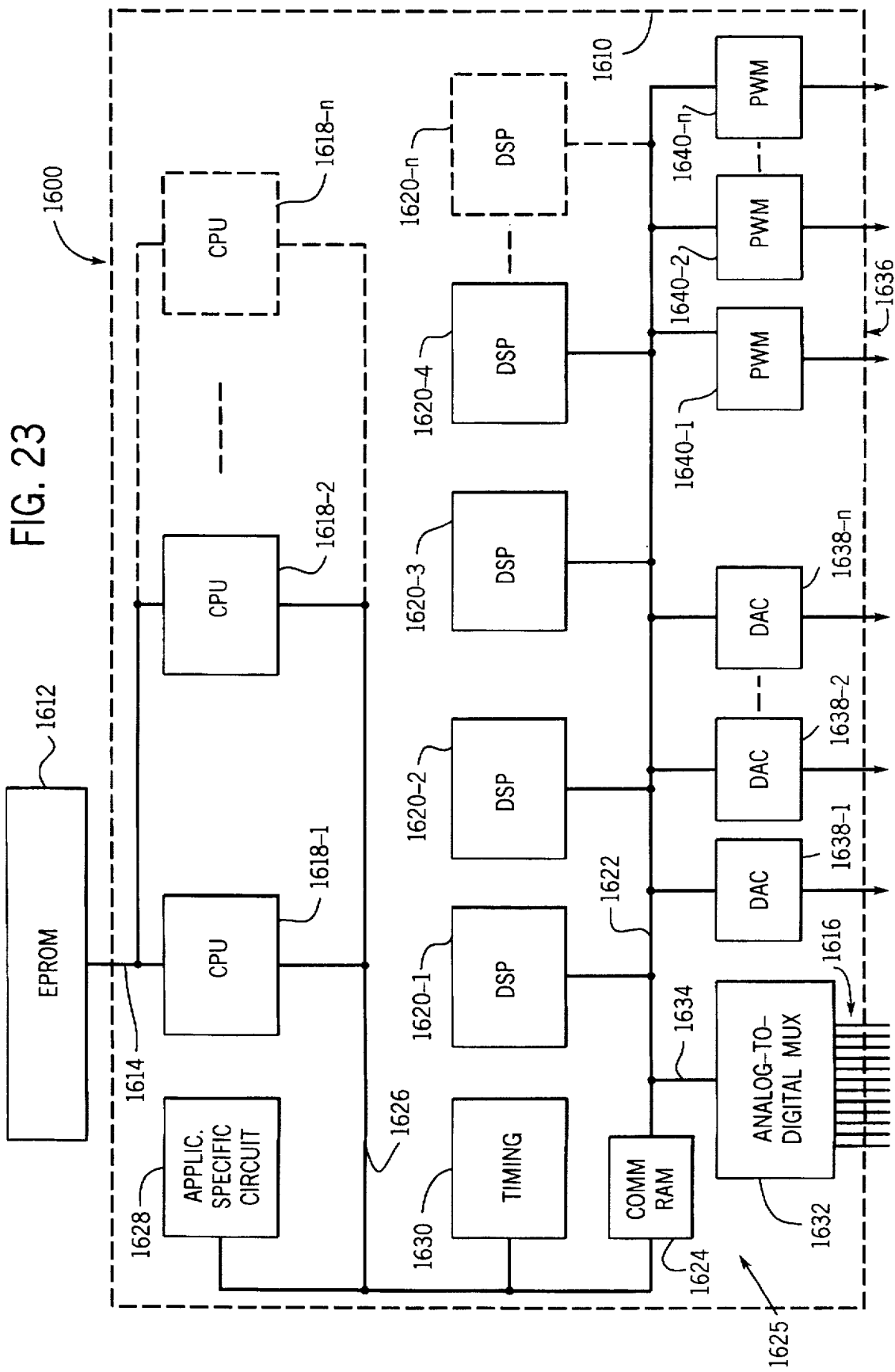
FIG. 23 is a schematic block diagram of the preferred embodiment of the present invention.

FIG. 23 is a schematic block diagram of the preferred embodiment of the present invention. In FIG. 23, a signal processing apparatus 1600 is illustrated, preferably embodied in an integrated circuit 1610.

Signal processing apparatus 1600 is operatively connected with an erasable programmable read-only memory (EPROM) 1612 by a line 1614 for providing selected inputs to and for receiving selected outputs from apparatus 1600. Additional inputs are received by signal processing apparatus 1600, in analog form, through analog input lines 1616. Signal processing apparatus 1600 includes a plurality of central processing units (CPUs) 1618-1, 1618-2, 1618-n. CPUs 1618 are all operatively connected with input line 1614 to receive inputs from EPROM 1612 or to provide outputs to EPROM 1612 via line 1614. A plurality of digital signal processors (DSPs) 1620-1, 1620-2, 1620-3, 1620-4, 1620-n are operatively coupled with CPUs 1618-series via a communications network 1625 comprising a bus 1622, a communications random access memory (RAM) controller 1624, and a bus 1626. An application-specific circuit 1628 and a timing source 1630 are also operatively connected with communications network 1625.

Analog input signals received at analog input lines 1616 are converted to digital format and multiplexed by analog-to-digital multiplexer 1632 and provided to communications network 1625 by a line 1634. A plurality of output devices 1636 are also connected to bus 1622 of communications network 1625. Specifically, digital-to-analog converters 1638-1, 1638-2, 1638-n and pulse width modulator units 1640-1, 1640-2, 1640-n are operatively connected with bus 1622. Output devices 1636 provide processed signals as outputs of signal processing apparatus 1600.

The provision of data signal processors (DSPs) 1620-1, 1620-2, 1620-3, 1620-4, 1620-n, communicatively connected through communications network 1625 with CPUs 1618 in an integral structure permits the partitioning of algorithms to be implemented by signal processing apparatus 1600 in an efficient manner. For example, general control instructions for controlling operation of signal processing apparatus 1600 may be implemented by the more general purpose CPUs 1618, and specific determinations of relationships which are amenable to data signal processing techniques may be exclusively handled by DSPs 1620. Application-specific circuit 1628 facilitates the adaptation of signal processing apparatus 1600 to particular applications by providing particular scaling characteristics, constants, or other operation-specific parameters peculiar to a specific application. Thus, a standardized signal processing apparatus 1600 may easily be tailored to a specific application.

Figure 24:
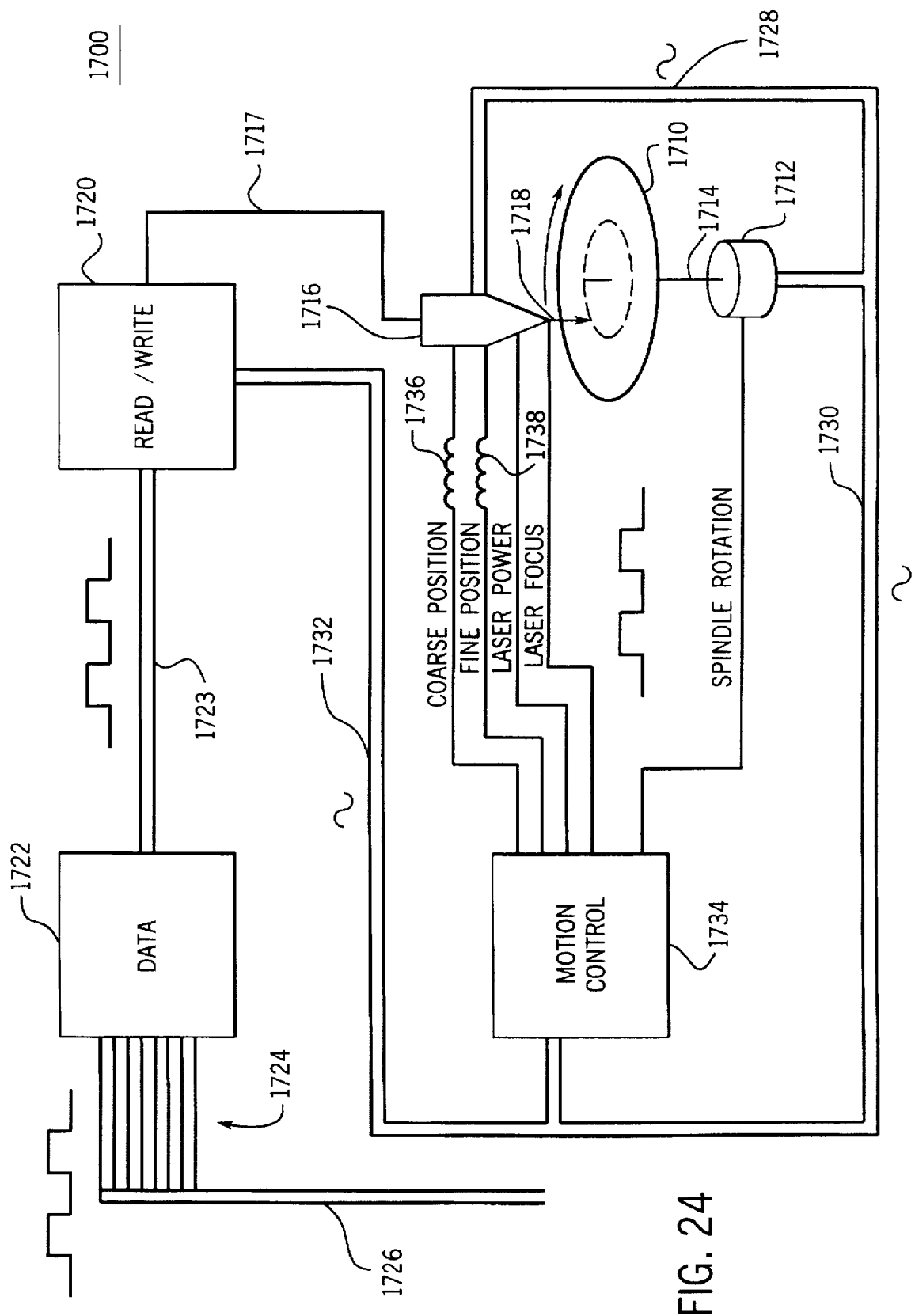
FIG. 24 is a schematic diagram of a magneto-optical disc storage device employing the preferred embodiment of the present invention for motion control.

For example, the preferred embodiment of the present invention illustrated in FIG. 23 is advantageously employed in a magneto-optical disc storage device, as illustrated in FIG. 24. In FIG. 24, a magneto-optical storage device 1700 includes a media disc 1710 on which digital information is stored. Media disc 1710 is driven by a disc driver 1712 about a spindle 1714. A reader head 1716 reads media disc 1710 by a laser beam 1718 in response to a read/write control circuit 1720. Read/write control circuit 1720 receives information in digital form from a data circuit 1722 via a bus 1723, which digital information conveys the address of desired information sought on media disc 1710 and other information. Data circuit 1722 receives inputs 1724 in digital form from a requesting processing unit (not shown) via bus 1726. Information read by reader head 1716 is conveyed to read/write control circuit 1720 via line 1717. Information thus received by read/write control circuit 1720 is conveyed in digital form to the requesting processing unit (not shown) via bus 1723, data circuit 1722, and bus 1726.

A motion control circuit 1734 receives feedback information in analog form from reader head 1716 via buses 1728 and 1730, and receives feedback information in analog form from disc driver 1712 via feedback bus 1730. Read/write circuit 1720 provides analog information via bus 1732 to motion control unit 1734. Information conveyed on bus 1732 represents information received by read/write circuit 1720 from data circuit 1722 via bus 1723.

Among the information which may be represented by analog signals conveyed from read/write circuit 1720 to motion control circuit 1734 via bus 1732 is header information identifying particular storage areas of media disc 1710 which are scanned by laser beam 1718.

Such header information may be converted to digital form and multiplexed by analog-to-digital multiplexer 1632 (FIG. 23) and conveyed to a CPU 1618 via communications network 1625. CPU 1618 may process such header information to aid reader head 1716 in quickly seeking a new address without overshooting the location of the address on media disc 1710 by tracking progress of reader head 1716 toward the newly-sought address location and decelerating the rate of movement of reader head 1716 as it approaches the address location sought. Such deceleration in approaching a sought location eliminates overshooting the sought location and saves the time which would be spent in recovering from such overshooting.

The algorithmic calculations associated with such a seeking operation are better suited for calculation by a CPU device than by a DSP device. Thus, such seeking algorithmic calculations are preferably included in the first set of instructions executed by CPU 1618.

Motion control circuit 1734 is preferably configured according to the preferred embodiment of the present invention illustrated in FIG. 23. Thus, considering FIGS. 23 and 24 together, inputs provided to motion control circuit 1734 from read/write circuit 1720 via bus 1732 and via bus 1730 from reader head 1716 and disc driver 1712 are received in the embodiment illustrated in FIG. 23 at analog input lines 1616 of signal processing apparatus 1600. Those signals received at analog input lines 1616 are converted to digital signals and multiplexed for provision to bus 1622 via line 1634 and communicated to a CPU 1618 via communications network 1625. In the embodiment of signal processing apparatus 1600 appropriate for implementation in the device illustrated in FIG. 24, a single CPU 1618 suffices.

Application-specific circuit 1628 provides appropriate scaling constants and other parameters for effecting motion control of reader head 1716 and disc driver 1712. The partitioning of algorithms required for operation of magneto-optical disc storage device 1700 (FIG. 24) involves providing that the five control signals provided as outputs from output devices 1636 be calculated in digital signal processor 1620-series (in the implementation appropriate for magneto-optical disc storage device 1700, two DSPs, 1620-1 and 1620-2 suffice). The employment of two DSPs 1620-1, 1620-2 allows algorithmic partitioning on the basis of priorities of control signals to be calculated. That is, algorithmic partitioning may be apportioned between DSP 1620-1 and DSP 1620-2 on a control signal priority basis. That is, for example, DSP 1620-1 may be employed to implement a digital signal processing algorithm to calculate high priority output control signals such as those control signals affecting coarse position, fine position, and spindle rotation. DSP 1620-2 could then be dedicated to implementing a digital signal processing algorithm to calculate lower priority control signals such as those control signals affecting laser power and laser focus.

In the calculation of higher priority control signals (e.g., coarse position, fine position, and spindle rotation) interrupt conditions may be encountered. For example media disc 1710 may wobble about spindle 1714 (a physical phenomenon occurring in three dimensions) causing the misalignment of laser beam 1718 with the desired storage area of media disc 1710 until motion control circuit 1734 can realign laser beam 1718 appropriately. In such event, an interrupt condition may be established by the digital signal processing algorithm relating to high priority control signals. In the preferred embodiment of signal processing apparatus 1600, an interrupt condition generated in connection with a high priority control signal is treated by CPU 1618 as a non-maskable interrupt so that calculations by CPU 1618 are halted until the interrupt condition is cleared.

Employment of digital signal processors integrally employed with central processing units to effect a priority-based partitioning of algorithms results in a signal processing apparatus which is cheaper to build, smaller in size, requires less power to operate, and has higher system performance in terms of speed and responsiveness than prior art signal processing apparatuses employing central processing units for all algorithmic calculations. User-controlled scheduled partitioning of algorithms may facilitate prioritization to enhance various operational aspects, such as speed of calculation, volume of calculations, paralleling calculations for increasing system responsiveness, or other aspects as desired.

Prior art, CPU-based signal processing apparatuses are limited by their processing speed; CPUs are not configured to effect calculations of certain types of algorithms as efficiently as DSPs can calculate those algorithms. The apparatus of the present invention, with its efficient partitioning of algorithmic calculations, including the scheduling for digital signal processing of certain types of algorithmic calculations particularly suitable for DSP treatment, results in the apparatus of the present invention having sufficiently improved operational speed that the apparatus is limited by mechanical limitations of magneto-optical disc storage device 1700 rather than systemic limitations of motion control circuit 1734. Specifically, by employing the preferred embodiment of the present invention illustrated in FIG. 23, the speed of reaction of magneto-optical disc storage 1700 is limited by the inductance and resistance of voice coil 1736 (which controls coarse position of reader head 1716) and voice coil 1738 (which controls fine position of reader head 1716), and the masses of solenoids employed in the actuator assemblies of voice coils 1736, 1738.

Adroit user-controlled scheduling of algorithmic calculations and instruction executions among CPUs 1618 and DSPs 1620 facilitates efficient, low cost, more compact, speedier signal processing by taking advantage of the characteristic strengths and avoiding the characteristic shortcomings of CPU and DSP devices. Simultaneous calculation of algorithms by a plurality of DSPs further contributes to speed and efficiency of signal processing.

The foregoing description is intended to describe the present invention but not to limit it. Clearly numerous additions, substitutions and other modifications can be made to the invention without departing from the scope thereof, as set forth in the appended claims.

What is claimed is:

1. An apparatus for executing a digital computational algorithm including a plurality of instructions on a plurality of analog received signals to generate a plurality of analog output signals for controlling an operation, said plurality of instructions including complex mathematical instructions and non-complex mathematical instructions, said apparatus comprising:

analog signal receiving means for receiving the analog received signals and providing a plurality of digital received signals;

digital signal processing means including a plurality of digital signal processors coupled to said analog signal receiving means for executing said complex mathematical instructions on said digital received signals to generate first instruction results;

general purpose processing means coupled to said analog signal receiving means and to said digital signal processing means for executing said non-complex mathematical instructions on said digital received signals and on said first instruction results to generate second instruction results, said general purpose processing means executing at least a portion of said non-complex mathematical instructions simultaneously with the digital signal processing means executing said complex mathematical instructions;

analog output means coupled to said digital signal processing means and to said general purpose processing means for outputting said second instruction results or said first instruction results as the analog output signals;

communication means including a RAM controller disposed between said digital signal processing means and said general purpose processing means for communicatingly coupling said analog signal receiving means, said digital signal processing means, said general purpose processing means, and said analog output means via a plurality of data busses; and wherein said digital signal processing means and general purpose processing means communicate said first instruction results and said second instruction results via the data busses when performing the digital computational algorithm.

2. The apparatus of claim 1 wherein said general purpose processing means includes an interrupt processor, wherein said general purpose processor executes said non-complex instructions on said digital received signals and said first instruction results in response to an interrupt signal.

3. The apparatus of claim 2 wherein said digital signal processing means includes a static scheduling means for scheduling execution of said complex instructions by said digital signal processing means and of said non-complex instructions by said general purpose processing means and for scheduling performance of system instructions by said general purpose processing means, the static scheduling means enforcing a first non-interruptable operational window where said general purpose processing means performs said non-complex mathematical instructions and an interruptable window where said general purpose processing means performs said system instructions, said interruptable window being separate from said computational algorithm.

4. The apparatus of claim 1 wherein each of said digital signal processors includes a hardware multiplier and wherein said general purpose processing means includes an arithmetic logic unit.

5. The apparatus of claim 1 wherein said computational algorithm is employed to control a magneto-optical disk storage device, said digital computational algorithm including a coarse position function and seek function.

6. The apparatus of claim 5 wherein the seek function is performed utilizing the non-complex mathematical instructions, the non-complex mathematical instructions being executed by the general purpose processing means.

7. The apparatus of claim 1 further comprising:
an application specific circuit coupled to said communication means, said application specific circuit providing application specific data associated with the operation, said application specific data for use with said complex mathematical instructions and said non-complex mathematical instructions.

8. The apparatus of claim 7 wherein said application specific data involves scaling characteristics and constants for said operation.

9. The apparatus of claim 8 wherein the digital signal processing means is a master device and the general purpose processing means is a slave device.

10. The apparatus of claim 7 wherein said general purpose processing means is coupled to a first data bus, said digital processing means is coupled to a second data bus, and said RAM controller is coupled between said first and second data busses, said first and second instruction results being communicated via said RAM controller and said first and second data busses.

11. The apparatus of claim 10 wherein said communication means includes a dual access RAM.

12. The apparatus of claim 10 wherein said general purpose processing means further executes system instructions related to user input parameters, said system instructions being executed when said general purpose processing means is not executing said non-complex mathematical instructions.

13. A communication processor integrated on a single substrate for performing a digital computational algorithm to generate an external signal, the algorithm including a plurality of first-type complex mathematical instructions, and a plurality of second-type non-complex mathematical instructions, the communication processor comprising:
an analog-to-digital converter coupled to an input which receives analog input signals, the analog-to-digital converter providing digital input signals;
a plurality of digital signal processors coupled to said analog-to-digital converter, said digital signal processors receiving said digital input signals, said digital signal processors executing said first-type mathematical instructions on said digital input signals and generating a plurality of first instruction results;
a plurality of general purpose processors coupled to said analog-to-digital converter and said digital signal processors, said general purpose processors executing said second-type mathematical instruction on said digital input signals and said first instruction results, said general purpose processors generating second instruction results, said general purpose processors executing said second-type mathematical instructions at least partially simultaneously with said digital signal processors executing said first-type mathematical instructions;
a digital-to-analog converter coupled to said digital signal processors and said general purpose processors, said digital-to-analog converter providing analog output signals indicative of at least one of said first instruction results and said second instruction results as said external signal; and
wherein said digital signal processors effect execution of said second-type instructions by said general purpose processors wherein said digital signal processors and said general purpose processors exchange said first and second instruction results when performing said digital computational algorithm.

14. The communications processor of claim 13, wherein said digital signal processors generate interrupt results in predetermined circumstances, and wherein said interrupt results are processed by said general purpose processors as priority interrupts, and wherein said general purpose processors execute said second-type instructions in response to said priority interrupts.

15. The communications processor of claim 13 further comprising a static scheduler for scheduling said first-type mathematical instructions and said second-type mathematical instructions among said digital signal processors and said general purpose processors, said static scheduler providing static partitioning of the performance of said computational algorithm and of general system operation, said static scheduler enforcing a first non-interruptable window where said general purpose processors perform said second-type instructions and a second interruptable operational window where said general purpose processors perform said general system operation separate from said computational algorithm.

16. The communications processor of claim 13 wherein said general purpose processors each include an arithmetic logic unit.

17. The communications processor of claim 16 wherein each of said digital signal processors includes a hardware multiplier.

18. The communications processor of claim 17 wherein each of the digital signal processors includes a hardware multiplier accumulator.

19. The communications processor of claim 18 wherein the first-type instructions are multiply-accumulate instructions.

20. The communications processor of claim 13 further comprising a RAM controller disposed between the general purpose processors and the digital signal processors.

21. The communications processor of claim 20 further comprising a first data bus;
a second data bus; and wherein said first data bus is coupled to said general purpose processors and said second data bus is coupled to said digital signal processors, said RAM controller being disposed between said first data bus and said second data bus, said first and second instruction results being communicated via said first data bus, said second data bus, and said RAM controller between said digital signal processors and said general purpose processors.

22. The communications processor of claim 13 wherein said second-type instructions are addition instructions.

23. The communications processor of claim 13 wherein the digital computational algorithm is utilized to produce the external signal for a motion control circuit in a magneto-optical storage device.

24. The communications processor of claim 23 further comprising an application specific circuit for providing scaling constants and other parameters for use in said digital computational algorithm.

25. An apparatus for algorithmically treating received information to generate result information in response to a plurality of instructions, said plurality of instructions including a first set of complex mathematical instructions for manipulating said received information, a second set of non-complex mathematical instructions for manipulating said received information, and a third set of instructions for controlling general system operation of the apparatus, the apparatus comprising:

a signal receiving means for receiving said received information;

first-type processing means coupled with said signal receiving means for executing said non-complex mathematical instructions on said received information and generating first instruction results, said first-type processing means further responding to said third set of instructions to control the operation of the apparatus;

second-type processing means, including a plurality of digital signal processors, coupled with said first-type processing means for executing said complex mathematical instructions on said received information and said first instruction results and generating second instruction results at least partially simultaneously with said first-type processing means execution of said non-complex mathematical instructions and said third set of instructions;

an output means for outputting said result information, said output means being coupled with said first-type processing means and with said second-type processing means, said result information being related to said first instruction results or said second instruction results; and a communication means for communicatingly coupling said signal receiving means, said first-type processing means, said second-type processing means, and said output means, said communication means including a first data bus, a second data bus and a RAM controller, the RAM controller being coupled between the first data bus and the second data bus, the first data bus being coupled to the second-type processing means, the second data bus being coupled to the first-type processing means, the first and second instruction results being communicated via said first data bus, said second data bus and said RAM controller between said first-type processing means and said second-type processing means.

26. An apparatus for algorithmically treating received information to generate result information as recited in claim 25 wherein an optically readable disc storage device receives said result information as a control signal, said optically readable disc storage device including a disc and a reader head, said reader head controlling a light beam and being movable to a position with respect to said disc for orienting said light beam appropriately to effect reading by said reader head of information stored on said disc, said disc rotating about a spindle to present selected areas of said disc for reading by said reader head, said position and said rotating cooperating to determine a specific storage area on said disc for said reading; said control signal comprising a plurality of storage device control signals, said plurality of storage device control signals including movement control signals for controlling movement parameters of said reader head, light control signals for controlling parameters of said light beam, and disc control signals for controlling rotation parameters of said disc.

27. An apparatus for algorithmically treating received information to generate result information as recited in claim 26 wherein said second-type processing means includes a static scheduling means for scheduling execution of said complex instructions by said second-type processing means and of said non-complex instructions by said first-type processing means, and said first-type processing means includes a general purpose processing unit.

28. An apparatus for algorithmically treating receiving information to general result information as recited in claim 27 wherein said second-type processing means comprises a first digital signal processor and a second digital signal processor; said first digital signal processor implementing first selected digital signal processing algorithms, said first selected digital signal processing algorithms determining first selected storage device control signals of said plurality of storage device control signals, said first selected storage device control signals being designated as first priority control signals by said static scheduling means, said second digital signal processor implementing second selected digital signal processing algorithms, said second selected digital signal processing algorithms determining second selected storage device control signals of said plurality of storage device control signals, said second selected storage device control signals being designated as second priority control signals by said static scheduling means thereby providing static partitioning of the performance of said algorithmic treating.

29. An apparatus for algorithmically treating received information to generate result information as recited in claim 28 wherein said general purpose processing unit comprises an arithmetic logic unit.

30. An apparatus for algorithmically treating received information to generate result information in response to a plurality of instructions as recited in claim 25 wherein the apparatus further comprises an application-specific circuit, said application-specific circuit being coupled with said communication means and arranged to provide predetermined parametric information to configure the apparatus for a particular said algorithmic treating.

31. A method of performing a computationally intensive algorithm and a system function in a communications processor integrated on a single substrate, the algorithm including a first-type complex mathematical instruction, and a second-type non-complex mathematical instruction, the communications processor including a first digital signal processor coupled to an input, a second digital signal processor coupled to the input, a general purpose processor coupled to the input, and an output coupled to the first digital signal processor, the second digital signal processor, and the general purpose processor, the method comprising the steps of:

receiving a first input signal at the input;

receiving a second input signal at the input;

executing the first-type mathematical instruction on the first input signal with the first digital signal processor to generate a first instruction result;

executing the first-type mathematical instruction on the second input signal with the second digital signal processor to generate a second instruction result;

receiving a third input signal at the input;

providing a signal to the general purpose processor to cause the general purpose processor to execute the second-type mathematical instruction on the third input signal to generate a third instruction result, the general purpose processor executing at least partially simultaneously with the first digital signal processor;

executing the first-type mathematical instruction with the first digital signal processor or the second digital signal processor on the third instruction result; and executing the second-type mathematical instruction with the general purpose processor on the first instruction result or the second instruction result.

32. The method of claim 31 wherein the communication processor includes a memory and the method further comprises steps:

storing the first instruction result, and the second instruction result in the memory; and storing the third instruction result in the memory.

33. The method of claim 31 wherein the signal is a non-maskable interrupt signal.

34. The method of claim 31 further comprising:

performing a general purpose system function with the general purpose processor when the general purpose processor is not executing the second-type mathematical instruction.

35. The method of claim 31 comprising:

providing the first instruction result, the second instruction result, or the third instruction result as an output signal.

36. The method of claim 35 wherein the output signal controls a coarse position, fine position, or spindle rotation associated with a magneto-optical storage device.

37. A communications processor for performing an operation, the operation including a computationally intensive task and a system task, the communications processor comprising:

an input;

a digital signal processor executing digital signal processor instructions on a received signal at the input and on a plurality of second instruction results to perform a computationally intensive task and generate first instruction results, the digital signal processor including a control signal output;

a general purpose processor having a control signal input coupled to the control signal output of the digital signal processor, the general purpose processor operating in a computational intensive window in response to a control signal from the control signal output, the general purpose processor executing mathematical instructions on the received signal at the input and on the first instruction results to perform the computationally intensive task and generate the second instruction results, the general purpose processor executing the mathematical instructions at least partially simultaneously with the execution of the digital signal processor instructions, the general purpose processor operating in a system window exclusive of the computational intensive window, to execute general purpose instructions to perform the system task.

38. The communications processor of claim 37 wherein the control signal output is an interrupt output and the control signal input is an interrupt input.

39. The communications processor of claim 37 further comprising:

a dual access RAM coupled to the general purpose processor and the digital signal processor, the dual access RAM storing operands for the digital signal processor instructions and the mathematical instructions.

40. The communications processor as recited in claim 39 wherein the dual access RAM has a first data bus coupled to the digital signal processor and a second data bus coupled to the general purpose processor.

* * * * *